(12) United States Patent  
Pack et al.

(10) Patent No.: US 8,453,102 B1  
(45) Date of Patent: May 28, 2013

(54) HIERARCHICAL VARIATION ANALYSIS OF INTEGRATED CIRCUITS

(75) Inventors: Robert C. Pack, Morgan Hill, CA (US); William Wai Yan Ho, San Jose, CA (US)

(73) Assignee: Worldwide Pro Ltd., Hong Kong (CN)

( * ) Notice: Subject to any disclaimer, the term of this patent is extended or adjusted under 35 U.S.C. 154(b) by 47 days.

(21) Appl. No.: 13/049,744

(22) Filed: Mar. 16, 2011

Related U.S. Application Data

(63) Continuation-in-part of application No. 13/047,621, filed on Mar. 14, 2011.

(60) Provisional application No. 61/314,268, filed on Mar. 16, 2010, provisional application No. 61/313,566, filed on Mar. 12, 2010, provisional application No. 61/314,268, filed on Mar. 16, 2010.

(51) Int. Cl.  
*G06F 17/50* (2006.01)

(52) U.S. Cl.  
USPC ........................................................ 716/139

(58) Field of Classification Search  
USPC .................................................. 716/100, 139  
See application file for complete search history.

(56) References Cited

U.S. PATENT DOCUMENTS

| | | | |
|---|---|---|---|
| 5,301,118 A | 4/1994 | Heck et al. | |
| 6,035,115 A | 3/2000 | Suzuki | |
| 7,350,171 B2 | 3/2008 | Zhang et al. | |
| 7,461,360 B1 | 12/2008 | Ho | |
| 7,827,016 B1 | 11/2010 | Ho | |
| 2005/0038639 A1 | 2/2005 | Lin | |
| 2005/0177356 A1 | 8/2005 | Yonezawa | |
| 2007/0277134 A1* | 11/2007 | Zhang et al. | 716/6 |

* cited by examiner

*Primary Examiner* — Suchin Parihar  
(74) *Attorney, Agent, or Firm* — Aka Chan LLP

(57) ABSTRACT

Technique assesses the impact of physical circuit variations, specification parameter variation, or process variations on clock, signal, and power network performance and through a hierarchical modeling and hierarchical Monte Carlo simulation method.

20 Claims, 19 Drawing Sheets

HIERARCHICAL VARIATION ANALYSIS OF INTEGRATED CIRCUITS

CROSS-REFERENCE TO RELATED APPLICATIONS

This application claims the benefit of U.S. provisional patent application 61/314,268, filed Mar. 16, 2010 and is a continuation-in-part of U.S. application Ser. No. 13/047,621 filed Mar. 14, 2011, which claims the benefit of U.S. provisional patent applications 61/313,566, filed Mar. 12, 2010, and 61/314,268, filed Mar. 16, 2010, which are incorporated by reference along with all other cited references in this application.

BACKGROUND OF THE INVENTION

This invention relates to the design of integrated circuits, and more specifically, to methods and systems for performing hierarchical variation analysis of integrated circuits through use of the unique new technology described here.
The age of information and electronic commerce has been made possible by the development of electronic circuits and their miniaturization through integrated circuit technology. Integrated circuits are sometimes referred to as "chips" or "ICs." To meet the challenges of building more complex and higher performance integrated circuits, various specialized software tools are used. These tools exist in one or more areas commonly referred to as; as; computer aided design (CAD), computer aided engineering (CAE), electronic design automation (EDA), or technology computer aided design (TCAD). This document focuses on the latter two, EDA and TCAD. Typically as technology advances such that more sophisticated technology modeling is required within EDA flows, TCAD tools and methods are routinely adopted and recast for EDA application.

There is a constant need to improve these tools for each technology generation in order to address the requirements for; higher integration, greater functional capability and complexity, smaller chip area, and better performance of integrated circuits.

It has been particularly important to improve tools in the areas design for manufacturability (DFM) and variation-aware modeling (VAM) due to the many inherent variations in play for nanoscale process technologies.

Despite vast increases in circuit and process technology complexity, market forces demand efficient robust design and well-controlled and quick time-to-market. Therefore, inherent manufacturability, yield, and reliability must still be maintained or improved and specialized DFM tools are now commonly used in integrated circuit design flows for this purpose.

These DFM tools are typically and primarily driven by the photolithographic patterning and pattern transfer processes which enable miniaturization for each successive process generation but do so with limited patterning fidelity. As such, these tools have primarily been focused on optimizing the geometric shape fidelity of the features defining the physical circuit in the lateral planes of the manufactured chip though the addition of artificial resolution enhancement technologies (RETs) such as optical proximity correction (OPC) to improve shape fidelity and subresolution assist features (SRAFs) to improve the manufacturing process window over which acceptable fidelity is achieved. Other artificial features are added to compensate for manufacturing limitations including dummy fill features to improve planarity. These highly planar layers are required for nanoscale lithography and great effort is expended to add dummy area fill features for this purpose. However, the addition of these RETs and dummy fill features is not a manufacturing pancea. Typically tradeoffs are made which can impact performance or yield and optimization of these is non-intuitive requiring highly advanced tools to aid in doing so. For example, strong OPC can impact the manufacturing process window over which acceptable performance yield is achieved. So one must be judicious.

Likewise, dummy fill typically has the unavoidable consequence of greater parasitic coupling of signals to the dummy feature thereby impacting logic and clock signals. So careful tradeoffs must be made between manufacturability and performance/yield.

These inherent nanoscale technology effects as well as many others not discussed mandate extensive analysis of variations, their consequences, and means to mitigate them so as to minimize their impact on the functional performance of the IC over an acceptable margin.

Ultimately, the function of ICs is graded based upon electrical function metrics. When DFM tools are primarily driven by electrical function metrics rather than geometrical shape, they are often referred to as Electrical Design For Manufacturing (eDFM) tools—so circuit simulation is a key component of eDFM. The so-called "parasitic" extractor is likewise a key component as it is used to generate from the design layout or from the simulated "silicon image" of it, the physical circuit in terms of elementary circuit elements; resistance (R), inductance (L), and capacitance (C), the three elements collectively, RLC or impedance.

However, eDFM tools are typically limited by circuit simulator capacity and speed due to the large number of non-ideal physical circuit features which must be resolved and considered in such a methodology for accurate results.

As IC interconnect, via, and device critical dimensions are reduced and/or system frequency is increased many additional so-called "parasitic" RLC effects must be considered. These parasitic effects can cause unwanted cross-coupling of signals, IR drop impacting signal, supply, or ground voltage, and noise in clock, signal, and power distribution networks. These effects can be significant and should properly be accounted for in simulation of the IC. If not, there is increased risk that the IC will have functional failure or performance limitations following fabrication and incorporation into an end product.

The number of parasitic effects has been increasing for each process generation and with increases in circuit size, complexity, and function simulating the impact of these parasitics can be an enormous challenge requiring very large computing resources and time.

Additionally, myriad variations impact integrated circuit performance and reliability and should be accounted for in any robust integrated circuit design flow. For nanoscale IC designs in general, variations occur in many forms and their impact on the IC function may be very non-intuitive. These variations occur even for a well-controlled fabrication processes simply due to fundamental physical limits dictating the resolution, planarity, or homogeneity of the physical circuit elements. Lithographically patterned features, even with the best RET techniques can be far from ideal resulting in geometrical feature distortions and variations in the distributed resistance, capacitance, and resistance of an interconnect or power network. Inter-layer dialectric and metal layer thickness variations due to imperfect planarization processes also occur similarly impacting the interconnect and power networks. Additionally, intrinsic variations due to fundamental material properties include statistical material inhomogneities of the various layers comprising the integrated circuit and may impact interconnect as well as active devices such as for example through statistical dopant fluctuations. Accounting for these variations is now required for robust design. Variations may also be exhibited in either/both intra-die or inter-die manner, meaning that the variations may be the same for each die or different for each die across the wafer of dice. An example of the former is due to pattern-dependent proximity effects such as from the photolithography process wherein constructive and destructive interference effects occurring during partially-coherent imaging causes critical feature shape variations. Examples of the latter include deposition or etch chamber effects impacting the across-wafer uniformity of a given process. These effects may also be time-varying as well. These variations increasingly must be accounted for during a well designed to reduce functional sensitivity to inherent variations in the fabrication of the IC.

Decreasing feature sizes, increased complexity, and greater function also means higher current densities within the clock, signal, and power distribution networks of ICs. Consequently, electro-thermal effects are similarly important. These thermal factors cause an increase in metal resistance impacting performance of an IC and also cause a reduction in reliability due to thermal and electromigration failure. These variations as well as other variations are increasingly important and may impact nanoscale IC design reliability and performance when the eventual product is used in the field. For example, the duty cycle and operating conditions of a design may severely impact the thermal distribution across the chip further stressing marginal electromigration-sensitive features and thereby impacting reliability or local resistance thereby reducing performance.

All of these variations have a far greater impact than ever before especially for low-voltage nanoscale designs or highly-integrated mixed-signal ICs. As these circuits get more complex, there are not only far more variations in play but the impact of these variations can be very difficult to ascertain due to the design size as well as the size and even uncertainty of the domain in which variations are in play. Simulating these variations is increasingly critical however the number of variations and the range in which one performs simulation is a significant problem due to not only the number of variations but also due to the size of the circuits which are impacted by these variations.

In circuit simulation, "corner-modeling" is a technique that has traditionally been used to verify performance extents of an integrated circuit design in terms of both device parameters impacted by manufacturing and chip operating specifications. The idea has been to reduce the simulation domain and make tractable the circuit simulations which are run in order to qualify a circuit's inherent functional performance in terms of the variations of key parameter or specification values. Now however, with nanoscale integrated circuit design and performance increasingly impacted by a large number of these variations, variations which are far less intuitive to comprehend than in prior generations, the problem becomes very difficult. The impact of these variations can be nonintuitive, non-linear, and can be statistically correlated or uncorrelated making it difficult to simplify the problem. This makes traditional corner modeling very difficult to validate over the large number of corners that would be required mandating Monte Carlo (MC) methods.

Companies that design nanoscale integrated circuits take on an increasing amount of risk with all of these additional variations and due to their inability to accurately model the impact of these variations. These effects are complex, increasingly intertwined, and can significantly impact the function, yield, and reliability of these ICs and the product they are used in. As a result, designers are typically overly conservative and employ excessive "worst-casing" and "guard-banding" resulting in designs that operate far beneath theoretical optimal operating capabilities potentially achievable otherwise. Typically, at least one full process generation is lost due to such margining. Even still, the risk is high and an increasing number of chip designs are go to fabrication without sufficient simulation over the full variation domain the designer would otherwise desire due to the large computational burden of doing so.

Further, while the cost of a major chip project can easily run into many tens or even hundreds of millions of dollars, the risks inherent in nanoscale design and manufacturing is increasing at a significant pace due to inadequate verification coverage over the variational domain.

Although there is great recognition of the problem, especially given that the cost of a IC failure is very large, designers have not had means to mitigate this risk at the scale required due to simulation tool limitations. It has not been possible to perform accurate simulations which capture the impact of these variations due to tools which must compromise in order to achieve capacity or speed requirements. The simulation network is typically too large for most simulators so a number of compromises are made. The most common compromise is hidden reduction of a circuit's complexity by the simulation tool in order to meet capacity or simulation speed requirements. The distributed parasitic RLC interconnect and power network is reduced to a simpler network comprised of fewer elements. However this also is likely to reduce the manufacturing details out of the simulation. The end result is that circuit simulation is no longer an accurate deterministic model of the original designer circuit, it may not be one-to-one mapped to the physical circuit layout, and variations of concern particularly for eDFM are reduced out of the solution altogether or not of value due to lack of deterministic accuracy.

Therefore, what is needed is a system and technique to enable accurate simulation of circuits impacted by variations across a representative range of manufacturing and operating parameter conditions. Further, what is also needed are tools capable of simulating the impact of nanoscale effects on large-scale circuit blocks or full chips without compromise in accuracy. These tools must also provide practical problem solutions within a reasonable timeframe. The following summary describes the necessity for a true hierarchical variation simulation method using reusable deterministic hierarchical models.

BRIEF SUMMARY OF THE INVENTION

A technique uses hierarchical compact reusable models with a hierarchical circuit simulator to perform a hierarchical variation analysis on integrated circuits. A new method is provided for fast and computationally-efficient modeling and simulation of electronic circuits over a range of circuit-element, -parameter, -model, or current or voltage source variations through a technique called hierarchical Monte Carlo variation modeling and simulation. This approach is superior to traditional Monte Carlo methods used in most IC simulators in terms of speed and capacity while not degrading accuracy. Far larger circuits may be simulated in far less time over a larger range of inputs. Computational effort is both focused and efficient in that only those hierarchical blocks or elements that need to be recomputed as determined by dependency path analysis will be recomputed enabling dramatic speedup of Monte Carlo simulations. The approach further enables efficient distribution of computational effort across multi-core and network-connected computational resources without any compromise in accuracy.

A method is provided for increasing the speed and capacity of Monte Carlo circuit simulation programs by exploiting compiled compact hierarchical reuse and replacement models which correspond to each subcircuit or block of subcircuits.

A method is provided for replacing one or more network model elements located anywhere in a given netlist, including resistors, capacitors, inductors, voltage or current sources, blocks of subcircuits, or individual subcircuits in a hierarchical simulation netlist or model with a compiled model(s).

A method is provided for reducing the number of computations in hierarchical simulation by dependency path analysis. Only those models corresponding to a subcircuit or element which are in a dependency path of an element or subcircuit which is being changed need to be regenerated.

A method is provided for variation analysis of hierarchical linear systems. A system is provided for variation analysis of hierarchical linear systems and circuits.

A method is provided for creating technology computer aided design (TCAD)-based compiled network models of passive network devices.

A method is provided for assessing the impact of a process, such as a change in a via mask or lithographic printing method, and environmental variation, such as electro-thermal variations on power network voltage or current distribution through use of a hierarchical Monte Carlo method.

A method is provided for assessing the impact of signal, clock, and power interconnect network physical feature variations on circuit function through use of a hierarchical Monte Carlo method.

A method is provided for hierarchical ECO (Engineering Change Order) rip-out-and-replace of interconnect wires or vias with compiled models on hierarchical netlists.

A method is provided for assessing the impact of transistor gate variations on power consumption or timing.

A method is provided for hierarchical ECO rip-out-and-replace of resistors, capacitors, inductors, voltage sources, current sources, or other devices with compiled models on hierarchical netlists.

A method is provided for hierarchical ECO rip-out-and-replace of subcircuits with compiled models on hierarchical netlists.

A method is provided for hierarchical sensitivity analysis enabling physical circuit elements or subcircuit hierarchical instances to be analyzed for sensitivity over a Monte Carlo simulation domain.

A method is provided for hierarchical clustering or principle component analysis enabling common-cause and/or key variates of a simulation to be determined over the Monte Carlo simulation domain.

A method is provided for hierarchical optimization enabling design centering or determination of optimal parameters over the Monte Carlo simulation domain.

A sample flow of an implementation of the invention is described following:

1) for a given hierarchical netlist (which may or may not be extracted from a physical netlist); 2) create a model of the netlist comprised of a hierarchy of submodels where the hierarchy of submodels may be used to perform a complete hierarchical simulation;

3) for a given identified netlist element (i.e. an impedance, Voltage source, or Current source); 4) for a given probability distribution and specified number of simulations to be performed, N; 5) determine a list of N varied element values which correspond to a statistical distribution of insertion element values; 6) for each of the N insertion element values, sequentially perform the following: 1. for the identified netlist element, perform a hierarchical replacement of that element in the netlist model comprised of hierarchical submodels, 2. recreate those submodels which are in a hierarchical dependency path without changing the others; 3. perform a hierarchical simulation using this new model, and 4. store the simulation results where the simulation results may be the nodal or branch voltage, branch current for any nodes/branches in the netlist; and 7) the subsequent simulation results are the hierarchical MC simulation.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
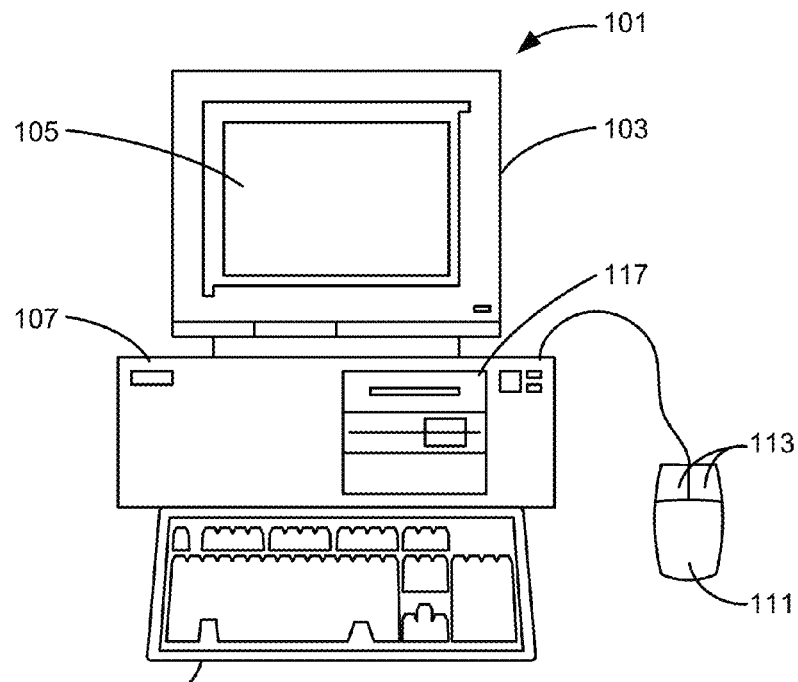
FIG. 1 shows a system of the present invention for modeling and simulating a hierarchical variation analysis on integrated circuits.

FIG. 1 shows a system of the present invention for modeling and simulating using hierarchical variation analysis for integrated circuits. In an embodiment, the invention is software that executes on a computer workstation system, such as shown in FIG. 1. FIG. 1 shows a computer system 1 that includes a monitor 3, screen 5, cabinet 7, keyboard 9, and mouse 11. In some implementations, however, electronic design automation systems are operated headless, which means these systems will not have a mouse, keyboard, display, and so forth. Mouse 11 may have one or more buttons such as mouse buttons 13. Cabinet 7 houses familiar computer components, some of which are not shown, such as a processor, memory, mass storage devices 17, and the like.

Mass storage devices 17 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these. A binary machine-executable version of the software of the present invention may be stored or reside on mass storage devices 17. Furthermore, the source code of the software of the present invention may also be stored or reside on mass storage devices 17 (e.g., magnetic disk, tape, CD-ROM, or DVD).

A computer-implemented version of the invention may be embodied using, or reside on, computer readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 17. The source code of the software of the present invention may also be stored or reside on mass storage device 17 (e.g., hard disk, magnetic disk, tape, or CD-ROM). As a further example, code of the invention may be transmitted via wires, radio waves, or through a network such as the Internet.

Figure 2:
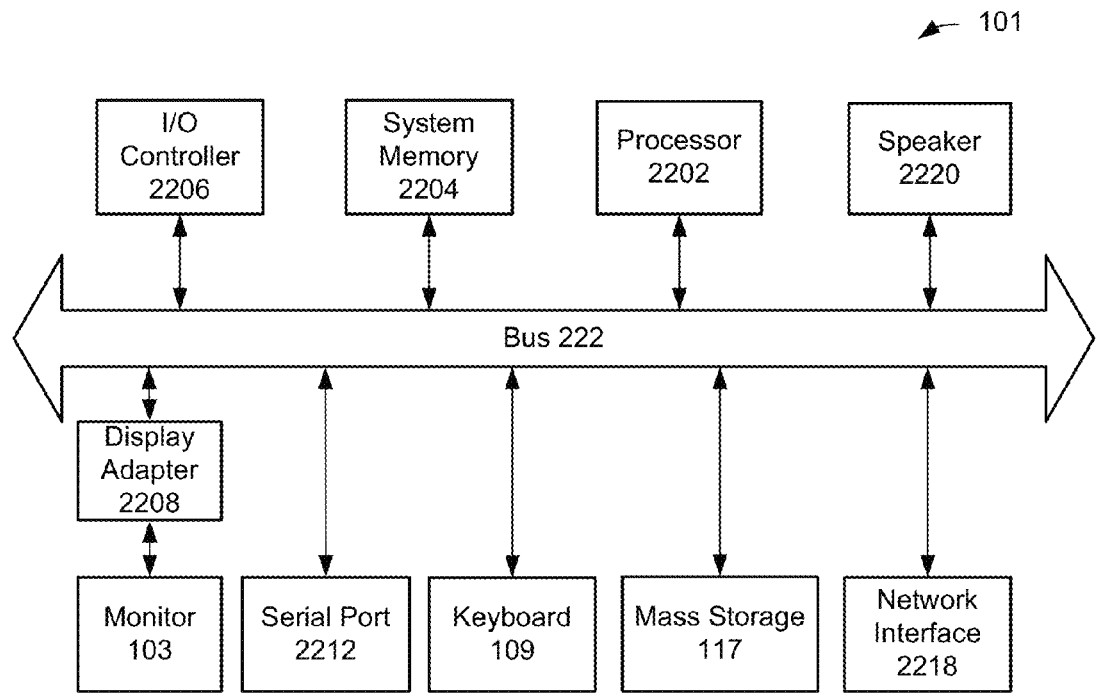
FIG. 2 shows a simplified system block diagram of a computer system used to execute software of the invention.

FIG. 2 shows a system block diagram of computer system 1 used to execute software of the present invention. As in FIG. 1, computer system 1 includes monitor 3, keyboard 9, and mass storage devices 17. Computer system 1 further includes subsystems such as central processor 2202, system memory 2204, input/output (I/O) controller 2206, display adapter 2208, serial or universal serial bus (USB) port 2212, network interface 2218, and speaker 2220. The invention may also be used with computer systems with additional or fewer subsystems. For example, a computer system could include more than one processor 2202 (i.e., a multiprocessor system) or the system may include a cache memory.

The processor may be a dual core or multicore processor, where there are multiple processor cores on a single integrated circuit. The system may also be part of a distributed computing environment. In a distributed computing environment, individual computing systems are connected to a network and are available to lend computing resources to another system in the network as needed. The network may be an internal ethernet network, Internet, or other network. Some examples of distributed computer systems for solving problems over the Internet include Folding@home, SETI@home, and the Great Internet Mersenne Prime Search (GIMPS).

Arrows such as 222 represent the system bus architecture of computer system 1. However, these arrows are illustrative of any interconnection scheme serving to link the subsystems. For example, speaker 2220 could be connected to the other subsystems through a port or have an internal connection to central processor 2202. Computer system 1 shown in FIG. 1 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, MatLab (from MathWorks, Inc.), SAS, SPSS, Java, JavaScript, and AJAX. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64, or combinations of these. Other operating systems may be used. Each computer in a distributed computing environment may use a different operating system.

Furthermore, the computer may be connected to a network and may interface to other computers using this network. For example, each computer in the network may perform part of the task of the many series of circuit simulation steps in parallel. Furthermore, the network may be an intranet, internet, or the Internet, among others. The network may be a wired network (e.g., using copper), telephone network (e.g., public switch telephone network or PSTN), packet network, an optical network (e.g., using optical fiber), or a wireless network, or any combination thereof. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

A specific type of electronic design automation tool is a circuit simulation program or system. A circuit simulation program performs analysis of circuits containing resistors, capacitors, inductors, mutual inductors, independent voltage and current sources, dependent sources, transmission lines, and semiconductor devices including diodes, bipolar junction transistors (BJTs), junction field effect transistors (JFETs), and metal over semiconductor field effect transistors (MOSFETs). A circuit simulator may perform nonlinear DC, nonlinear transient, linear AC, and other analyses.

One circuit simulation program is Simulation Program with Integrated Circuit Emphasis (SPICE), originating from the University of California, Berkeley. Despite the success of SPICE and other circuit simulation programs, existing circuit simulation programs use methodology and computational techniques not suitable for; use in distributed computing environment, using compiled replacement models of subcircuits, or true hierarchical simulation, and variation analysis spanning a large number of input variations.

In integrated circuit design, it is typically desired to verify or analyze a given circuit design across the design and manufacturing process windows in order to validate acceptable performance and yield considering intrinsic variations, likely real world manufacturing excursions, and in-field use and environmental conditions.

"Corner Analysis" is a technique that has traditionally been used as a means for doing this type of worst-case analysis. This technique is based on assumptions that many believe are overly-simplistic in the nanoscale era. Only a few intuitive variations are typically simulated. Significant performance is left on the table while not improving yield since nanoscale technology demands far more rigorous methods and analysis over nontraditional variates for design-for-manufacturability (DFM) and design-for-yield (DFY).

SPICE and its commercial derivatives often provide Monte Carlo simulation capabilities. However, this type of Monte Carlo circuit simulation is typically extremely slow and capacity-limited making it poorly-suited for very large circuits. Any thought of using Monte Carlo on large circuits is typically quickly dismissed as being "impossible" or "unrealistic."

A category of simulators referred to as "fast SPICE simulators" typically use approximate methods such as network and model-order reduction methods in order to achieve higher speed or capacity. This class of simulator often perform these reductions in a hidden manner resulting in non-deterministic results thereby limiting their validity for accurate Monte Carlo simulation. A Monte Carlo model should of course be deterministic. However even still, as with SPICE, this class of simulator typically lacks true hierarchical processing capabilities making large Monte Carlo simulation impractical for anything but relatively small circuits.

Monte Carlo (MC) methods in general belong to a class of computational algorithms that use repetitive random sampling and simulation of a deterministic model to achieve a distribution of results over the sampling ranges. Model inputs are randomly generated from probability distributions to simulate the process of sampling from an actual population. It is desirable to choose distributions that closely match data already obtained or best represents a priori knowledge of the system.

MC methods are typically used in simulation of complex physical systems particularly when the deterministic model is computationally expensive in terms of time and there are a large number of coupled degree-of-freedoms. By using random inputs, we are essentially turning the deterministic model into a stochastic model to enable evaluation of results on a stochastic basis.

MC methods span a large class of different approaches. There is no one MC method. These approaches generally include:

Creating a deterministic parametric model, $y=f(x_1, x_2, \ldots, x_q)$. Determining/defining the domain and range of each variable, often experimental design techniques are used.

Generating a set of random inputs, $x_{i1}, x_{i2}, \ldots, x_{iq}$. Over the range of each variable, randomly generate inputs using a specified probability distribution.

Evaluate the model and store the results as $y_i$. Using the model, compute results for all of the inputs.

Output the results as a distribution of all simulations in whole and analyze the results using histograms, summary statistics, confidence intervals, etc.

The difference in MC techniques typically involve the method of sampling or weighting of the sampled values based upon one's a-priori knowledge of the problem and what one wants to achieve. Any of these variants may be used with the hierarchical methods described here.

The reference, Jun S. Liu, *Monte Carlo Strategies in Scientific Computing* (Springer Series in Statistics, Jan. 4, 2008) describes many of these various MC techniques and is incorporated by reference.

The Monte Carlo simulation method is often used when a model is complex, nonlinear, or involves a number of uncertain parameters in a manner such that calculating a continuous distribution would be prohibitive. Even still, a simulation can typically involve hundreds, thousands, or even millions of model evaluations. This task in the past was limited in the application of the technique—either the model needed to be relatively small and fast to evaluate the model or a supercomputer was required to perform the evaluations. No longer, if the problem can be decomposed hierarchically with reusable models.

Figure 3:
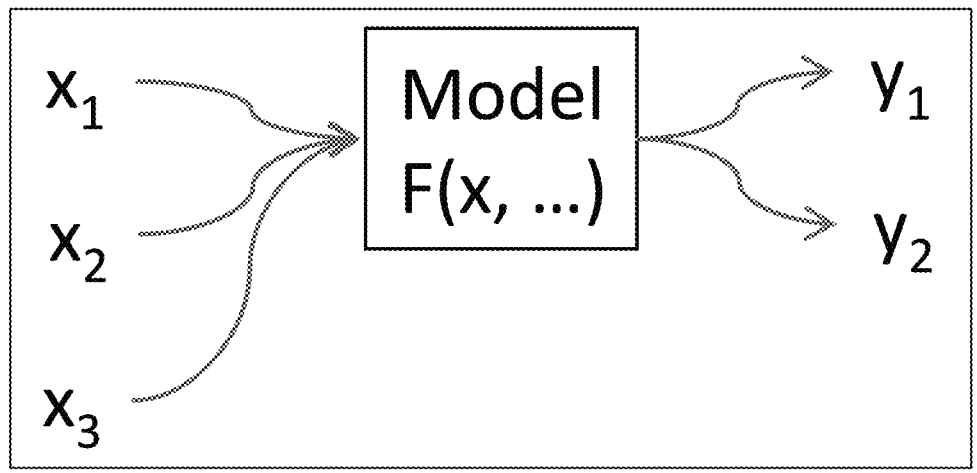
FIGS. 3-4 show a sample method of a Monte Carlo technique.
Figure 4:
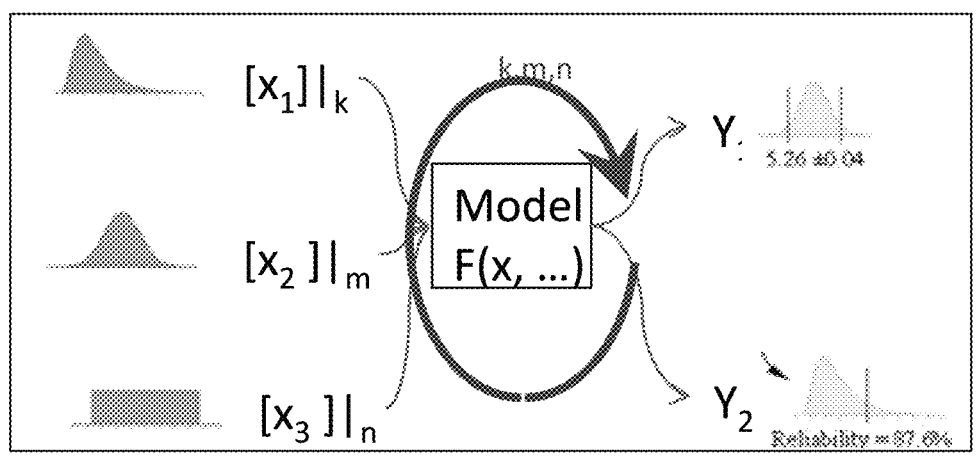

FIGS. 3-4 show concepts of a model for a Monte Carlo technique. In FIG. 3, input variables x1, x2, and x3 are used as inputs into the model $F(x, \ldots)$, and the model, maps these inputs to a set of output variables y1 and y2. If the model is small and fast the computational burden is small and a large number of input variables may be simulated to for the Monte Carlo simulation result. However, if the model is large and time-consuming and the number of input variations is large, the computational burden quickly becomes extreme. Therefore, it is important to generate accurate models with few or no simplifications, and yet allow the models to be reused so that the entire IC does not have to be resimulated. Additionally, results for a model at specific input variables can be stored to further prevent resimulation.

Models for a Monte Carlo technique that are mathematically complete and accurate following a KVL, KCL, and energy conservation validation check are necessary. For example, see U.S. Pat. No. 7,461,360, issued Dec. 2, 2008, and U.S. patent application Ser. No. 12/238,880, filed Sep. 26, 2008, which are incorporated by reference. The technique of the invention can work in conjunction with the techniques described by these patent applications.

As shown in FIG. 4, data generated from the simulation can be represented as probability distributions or converted to error bars, reliability predictions, tolerance zones, or confidence intervals. Input variables $x_1|_k$, $x_2|_m$, and $x_3|_n$ are used as input into model $F(x, \ldots)$, and this model maps these inputs to a set of output variables $y_1$ and $y_2$.

Traditional Monte Carlo based circuit simulation and analysis of electronic circuits using SPICE (Simulation Program Integrated Circuits Especially) or other circuit simulators occurs in a nonhierarchical or "flat" manner. Although these simulators typically use a hierarchical circuit description syntax, the actual processing either occurs in a flat manner or uses simplified models of hierarchical cells in an attempt to approximate hierarchical processing. This, of course, compromises accuracy as the models cease to be deterministic and become a variation source in themselves.

The traditional Monte Carlo based simulation enables one to compute the circuit response for a random or weighted random distribution of parameter variations over a specified range. By simulating hundreds, thousands, or even millions of different parameter cases over the expected range of variations one can determine the performance and other response conditions of the circuit in a manner which is more accurate than alternative techniques which simplify the circuit or make simplifying statistical assumptions.

In its traditional usage in circuit simulation, the Monte Carlo technique is extremely computationally expensive and inefficient. This is because the entire circuit must be recomputed for each Monte Carlo condition that alters any circuit element. With the traditional Monte Carlo approach, the model is computationally flat meaning that all computations are done each and every time. So the overall model needs to be evaluated each time in the Monte Carlo loop, and although the overall model can inherently be distributed across a network of machines for each independent set of inputs, the burden of evaluating a large flat model is nonetheless expensive, especially when one is doing a large number of simulations. Consequently, the Monte Carlo technique is relegated to fairly small circuits or to very high-value circuits which can justify the potential weeks or months of simulation time or supercomputer time.

In the integrated circuit industry, it is desirable to perform Monte Carlo analysis on large circuits within reasonable timeframes. Current tools are limited both in terms of circuit size as well as execution time.

Robust design typically requires circuits to be inherently high-yielding and stable despite variations. Designers may explore Variation Aware Modeling (VAM) and Variation Aware Design (VAD) to center a design in the process window or body, to determine overly sensitive design-process attributes in the design cycle, and to verify that a circuit will robustly accommodate variations in the process and in environmental conditions over the designed lifetime of the integrated circuit product.

Further, traditional SPICE-level EDA tools are not able to fully account for these effects and simulate across a sufficiently-large and representative range of manufacturing and operating parametric variations for large circuit blocks. These tools are limited in both speed and capacity. As a result, the EDA industry has responded to this need with tools relying upon a range of approximate techniques to overcome these limitations. These techniques typically reduce the circuit complexity through RCL networks and circuit model reduction in addition to using other approximate techniques in the solution of a circuit.

However these simplifying assumptions typically limit their general application and accuracy as well as self-consistent simulation repeatability for a given network under different simulator conditions. True SPICE-accurate Monte Carlo simulation is a desired standard for any type of detailed variational or statistical analysis. However, until now this has been unattainable for large circuits.

Further, techniques of the invention use a true hierarchical Monte Carlo technique for integrated circuit simulation and analysis which overcomes the computational speed and resource limitations of the conventional Monte Carlo technique. A true hierarchical Monte Carlo approach has not been done before due because there are currently no other true hierarchical circuit simulators capable of simulation reuse. Some circuit simulators may be able to use hierarchical circuit netlists. However it is important to know that they do not process the circuit hierarchically nor provide for general hierarchical computational reuse without loss of accuracy. That is, although they may parse the hierarchical circuit, they typically flatten the circuit during processing, then either simulate the flattened circuit or generate a new hierarchy for simulation.

As a result, it is not possible to implement true hierarchical Monte Carlo processing of a circuit and there is no hierarchical reuse capability to enable the dramatic speed advantages inherent in an embodiment of the invention.

U.S. Pat. No. 7,827,016, "Simulating circuits by distributed computing" issued Nov. 2, 2010 is incorporated by reference along with all other references cited in this application. The reader is referred to this reference for a more in-depth discussion of hierarchical partitioning, model generation, and distributed computing methods that we refer to here.

U.S. provisional patent application 61/313,566, filed Mar. 12, 2010, is incorporated by reference along with all other references cited in this application.

Further, techniques of the invention enable a hierarchical Monte Carlo analysis to be performed on extremely large circuits within a reasonable timeframe. The analysis involves minimizing the number of computations that need to be done between different simulations by exploiting computational reuse. Those subcircuits that change (e.g., due to a variation) or are in a dependency path will require model regeneration, however other models for unaffected subcircuits can be reused. As a result, dramatic speed advantages can be enjoyed. The speed and accuracy of a hierarchical Monte Carlo simulation approach enables simulation and analysis of circuits that were previously thought to be virtually impossible to use the Monte Carlo technique due to capacity, speed, and accuracy limitations.

Figure 5:
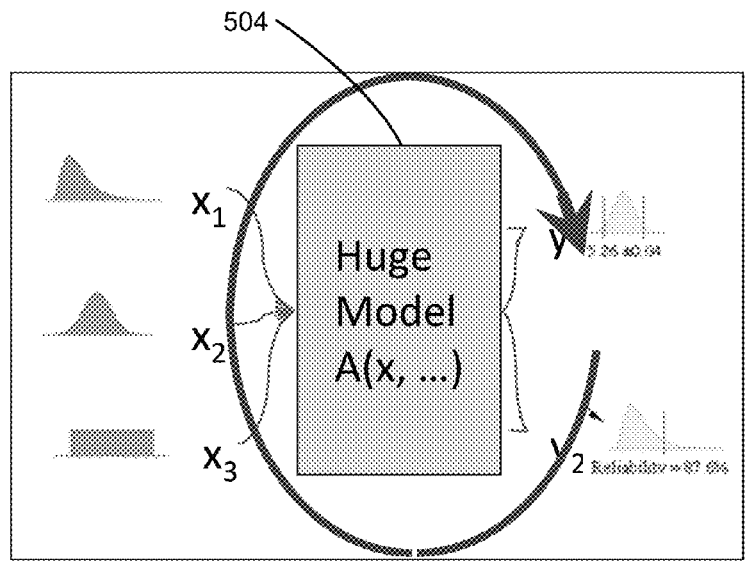
FIGS. 5-6 show a sample method of a hierarchical Monte Carlo technique.
Figure 6:
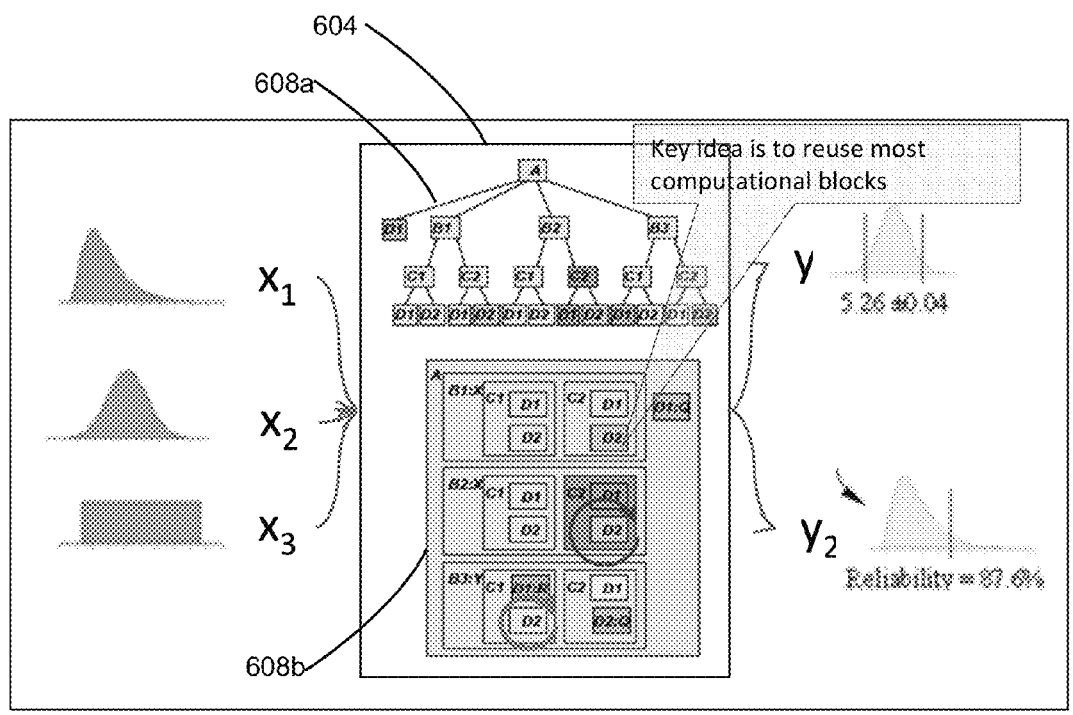

FIGS. 5-6 show concepts and advantages of a hierarchical Monte Carlo technique. In FIG. 5, a conventional Monte Carlo method is illustrated. The input variables x1, x2, and x3 are used as input into a huge flat model A(x, . . . ) 504 where "A" represents a traditional simulator and netlist. For each and every set of inputs, Model 504 simulates the output response and a set of output values, y1 and y2. In this approach the entire circuit, "A", must be simulated for each set of inputs resulting in a large and time-consuming computational burden.

In a hierarchical Monte Carlo implementation, the model "A" may be decomposed into a hierarchical aggregate of independent submodels. For a hierarchical netlist, there is a model for each subcircuit. For a flat netlist, the circuit may be broken down into a hierarchical netlist by the techniques such as described in ref ( ) enabling the same advantages with a flat netlist as with a hierarchical netlist. FIG. 6 illustrates a hierarchical model 604 in two views. The first view shows a hierarchical tree structure 608a view and 608b shows the hierarchical layout or block view. This hierarchical structure, can be used in a hierarchical Monte Carlo technique for simulating a circuit. The hierarchical tree structure has circuit block cells for the circuit. Cell A has subcells D1, B1, B2, and B3. Cell B1 has subcells C1 and C2. Cell B2 has subcells C1 and C2. Cell B3 has subcells C1 and C2. In this figure, there are three C1 cells, and each C1 cell has subcells D1 and D2. There are also three C2 cells, and each C2 cell has subcells D1 and D2. The layout shows a block diagram of the hierarchical tree structure. When the hierarchical Monte Carlo simulator is first run, there are no models so models are generated for each cell. As a result each cell will then have a corresponding computational model. The Cell A model is comprised of the hierarchy of all models it contains. A simulation may be run using this hierarchy of models to determine a response.

It is desirable to reuse computational models for greatest computational efficiency and to minimize the use of system resources. Any of the previously generated models can be reused for subsequent simulations if it is not in a dependency path of any circuit element that is changed. If we know this rigorously we can reuse model saving a great deal of computational effort that would be expended regenerating the model. Referring once again to FIG. 6, the computational burden as illustrated in localized to a smaller number of computational blocks. Therefore there is an obvious speed and computational resource advantage. What was a repetitive solution of a huge flat problem in FIG. 5 becomes a repetitive solution of a small problem in FIG. 6 as we are able to reuse any existing model that is not in a dependency path.

Additionally, while the present application specifically discusses the hierarchical Monte Carlo method for the purpose of dithering circuit netlist physical elements or parameters in a random manner, the technique may also be used with nonrandom sets of parameter variations such as one would do for corner-analysis, full-factorial analysis, or any sort of experimental tree for explicitly specified parameters or parameters that may follow a nonrandom distribution.

A hierarchical Monte Carlo technique both minimizes recomputation and also enables distribution of small component parts across a distributed network for parallel computation. FIGS. 7-10 show flows that can be used for generating and compiling Monte Carlo models.

Some specific flows for a hierarchical variation analysis on integrated circuits are presented in this patent application, but it should be understood that the invention is not limited to the specific flow and steps presented. A flow of the invention may have additional steps (not necessarily described in this application), different steps which replace some of the steps presented, fewer steps or a subset of the steps presented, or steps in a different or alternative order than presented, or any combination of these. Certain steps may be repeated as needed. Further, the steps in other implementations of the invention may not be exactly the same as the steps presented and may be modified or altered as appropriate for a particular application or based on the circumstances.

For simplicity, the following describes a simple case of hierarchical interconnect model generation and Monte Carlo analysis using this hierarchical model but replacement of a given subcircuit or element in existing models with variants of these models to effect variation analysis.

Figure 7:
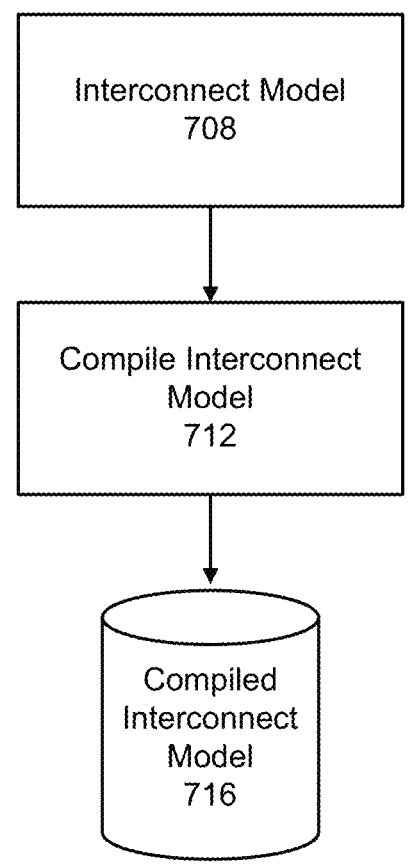
FIG. 7 shows a flow for compiling an interconnect model.
Figure 8:
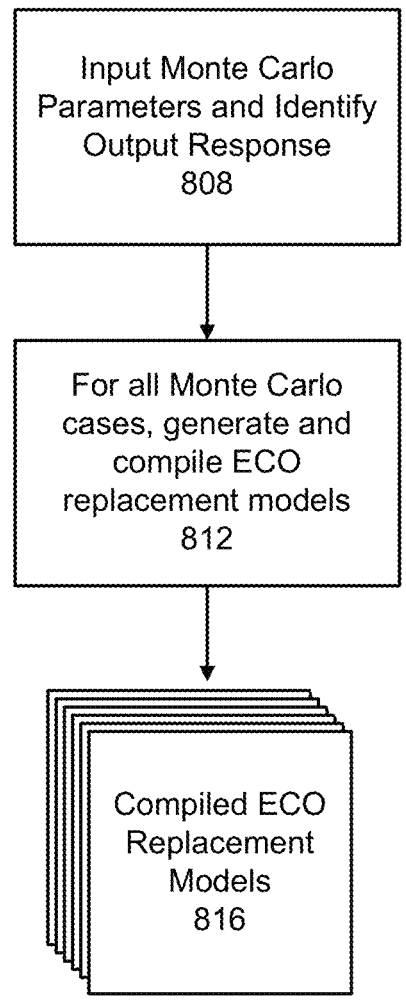
FIG. 8 shows a flow for compiling engineering change option replacement models for all Monte Carlo cases.
Figure 9:
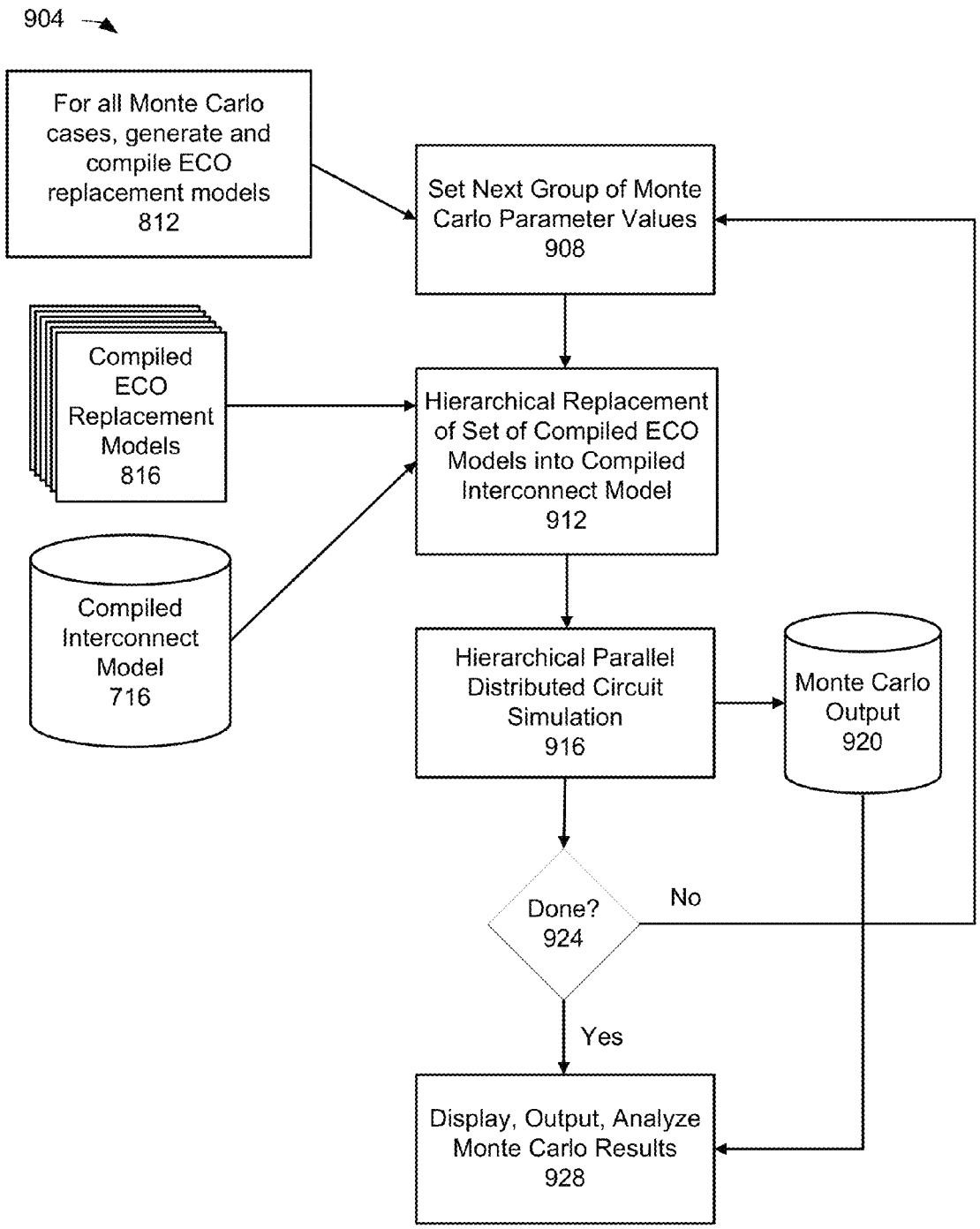
FIG. 9 shows a flow for displaying, outputting, and analyzing Monte Carlo results.

In particular, FIGS. 7-9 show a specific flow for creating reusable Monte Carlo models. FIG. 7 shows a flow 704 for compiling an interconnect model from a given hierarchical or flat netlist.

This simulation netlist is typically extracted from a standard parasitic extraction DSPF netlist file generated by a parasitic extraction program. The parasitic extraction program, using technology information from the fabrication foundry which describes both electrical materials properties as well as layer thicknesses together with the design layout, extracts the detailed physical circuit into a DSPF netlist file.

In a step 708, a simulation interconnect netlist extracted from the DSPF netlist and may be comprised of resistors, capacitors, and inductors. Current or voltage sources and current or voltage waveform dynamic stimulus are added to the netlist to form a complete simulation netlist. In a step 712, the interconnect model is compiled from the simulation netlist into a hierarchy of reusable models as described previously. Simulations using these models are able to run very quickly.

More details of the interconnect model compiler is discussed below (see FIG. 11 discussion). Here we refer to a model compiler as being a circuit simulation program which has the capability of generating a reusable hierarchical simulation model. The resulting model is referred to as a compiled model or compiled reuse model. A simulation netlist comprised of subcircuits will have compiled reuse models for each subcircuit.

The compiled interconnect model 716 can be stored in a file, such as a database file (stored on a hard disk or server) for use by other processes or flows. For example, the interconnect model is used in a flow described in FIG. 9.

FIG. 8 shows a flow 804 for compiling engineering change option (ECO) replacement models for Monte Carlo cases. In a step 808, Monte Carlo parameters are input and output responses are identified. After the parameters are input and output responses are identified, in a step 812, ECO replacement models are generated and compiled for all Monte Carlo cases. A family of compiled ECO replacement models 816 is generated. The generated and compiled ECO replacement models can be checked into a library of models if desired and used in other flows. For example, the generated and compiled ECO replacement models are used in a flow described in FIG. 9.

FIG. 9 shows a flow 904 for displaying, outputting, and analyzing Monte Carlo results. In a step 908, using the generated and compiled ECO replacement models as input, a group of Monte Carlo parameters values is set. After the group of Monte Carlo parameters values has been set, in a step 912, using the compiled ECO replacement models 816 and compiled interconnect models 716 as input, a hierarchical replacement of a set of compiled ECO models into a compiled interconnect model is implemented. In a step 916, a hierarchical parallel distributed circuit is simulated. In a step 920, a Monte Carlo output of the simulation performed in step 916 can be stored in a file, such as a database file.

After the circuit simulation, in a step 924, it is determined whether there is another group of Monte Carlo parameters values to be processed. If there is another group of Monte Carlo parameters values to be processed, process flow returns to step 908 and another group of Monte Carlo parameter values is set. If there is not another group of Monte Carlo parameters values to be processed, process flow proceeds to a step 928. In step 928, Monte Carlo results are displayed, output, and analyzed. Further, even if not all to-be processed groups of Monte Carlo parameters values are processed, a Monte Carlo output 920 can still be displayed, output, or analyzed.

Further, as already discussed, these steps may be modified. For example, in an implementation, Monte Carlo results are displayed and output, but not analyzed.

Figure 10:
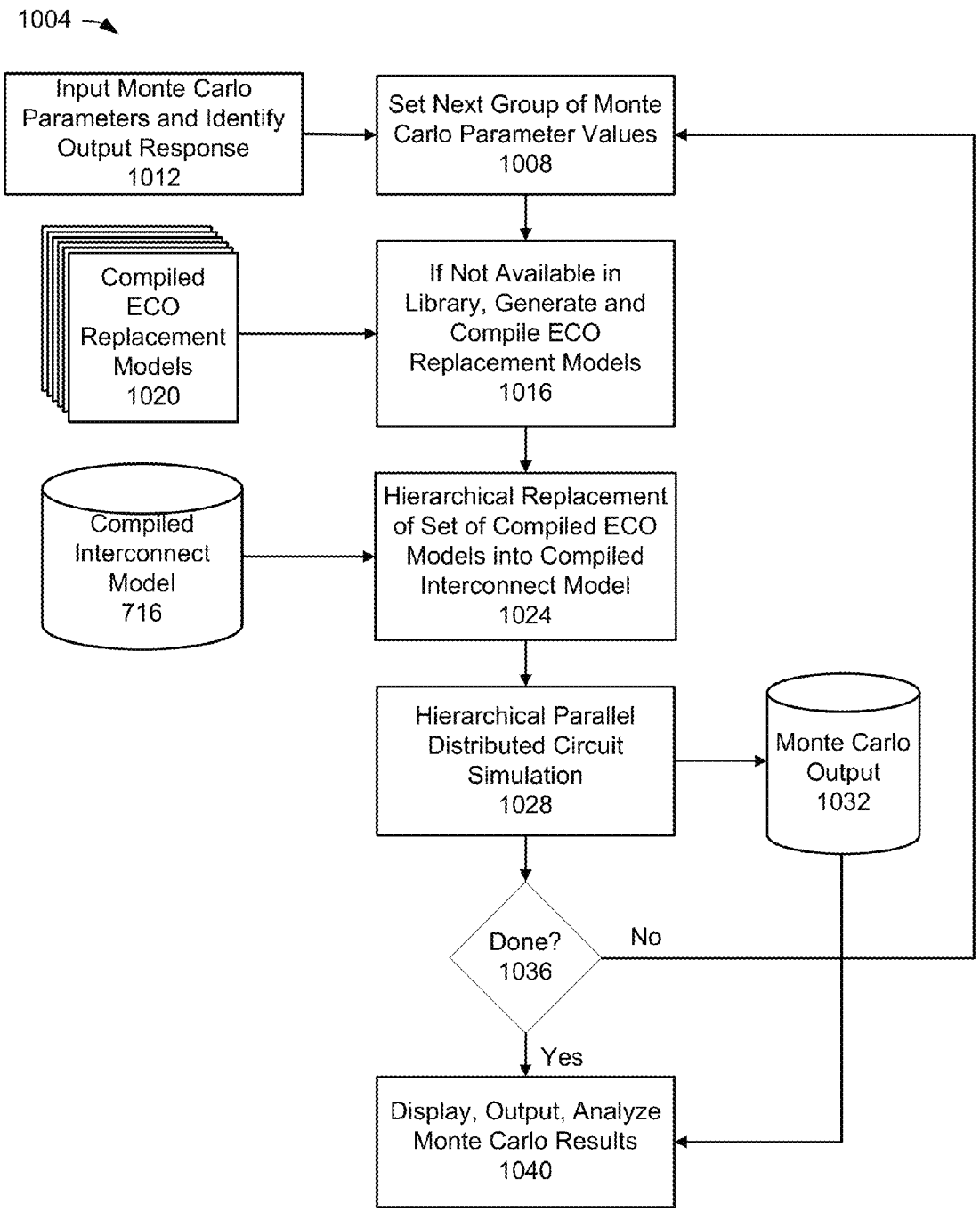
FIG. 10 shows another flow for displaying, outputting, and analyzing Monte Carlo results.

FIGS. 7 and 10 show a specific flow for generating and compiling Monte Carlo models as needed. FIG. 7 was described above. FIG. 10 shows a flow 1004 for displaying, outputting, and analyzing Monte Carlo results.

In a step 1008, using the input Monte Carlo parameters and identified output responses 1012 as input, a group of Monte Carlo parameters values is set. After the group of Monte Carlo parameters values has been set, in a step 1016, a library or other data store is searched for ECO replacement models 1020. If the ECO replacement models are not available in the library, ECO replacement models are generated and compiled. In a step 1024, using a compiled interconnect model 716 as input, a hierarchical replacement of a set of compiled ECO models into compiled interconnect model is performed. In a step 1028, a hierarchical parallel distributed circuit is simulated. In a step 1032, a Monte Carlo output of the simulation performed in step 1028 can be stored in a file, such as a database file.

A hierarchical ECO, in this context, refers to the process of replacing a netlist element or subcircuit in a hierarchical netlist which may be in a database or in a compiled model with another netlist element or subcircuit which may also be in a database or compiled model.

After the circuit simulation, in a step 1036, it is determined whether there is another group of Monte Carlo parameter values to be processed. If there is another group of Monte Carlo parameters values to be processed, process flow returns to step 1008 and another group of Monte Carlo parameters values is set. If there is not another group of Monte Carlo parameters values to be processed, process flow proceeds to a step 1040. In step 1040, Monte Carlo results are displayed, output, and analyzed. Further, even if not all to-be processed groups of Monte Carlo parameters values are processed, a Monte Carlo output 1032 can still be displayed, output, or analyzed.

Figure 11:
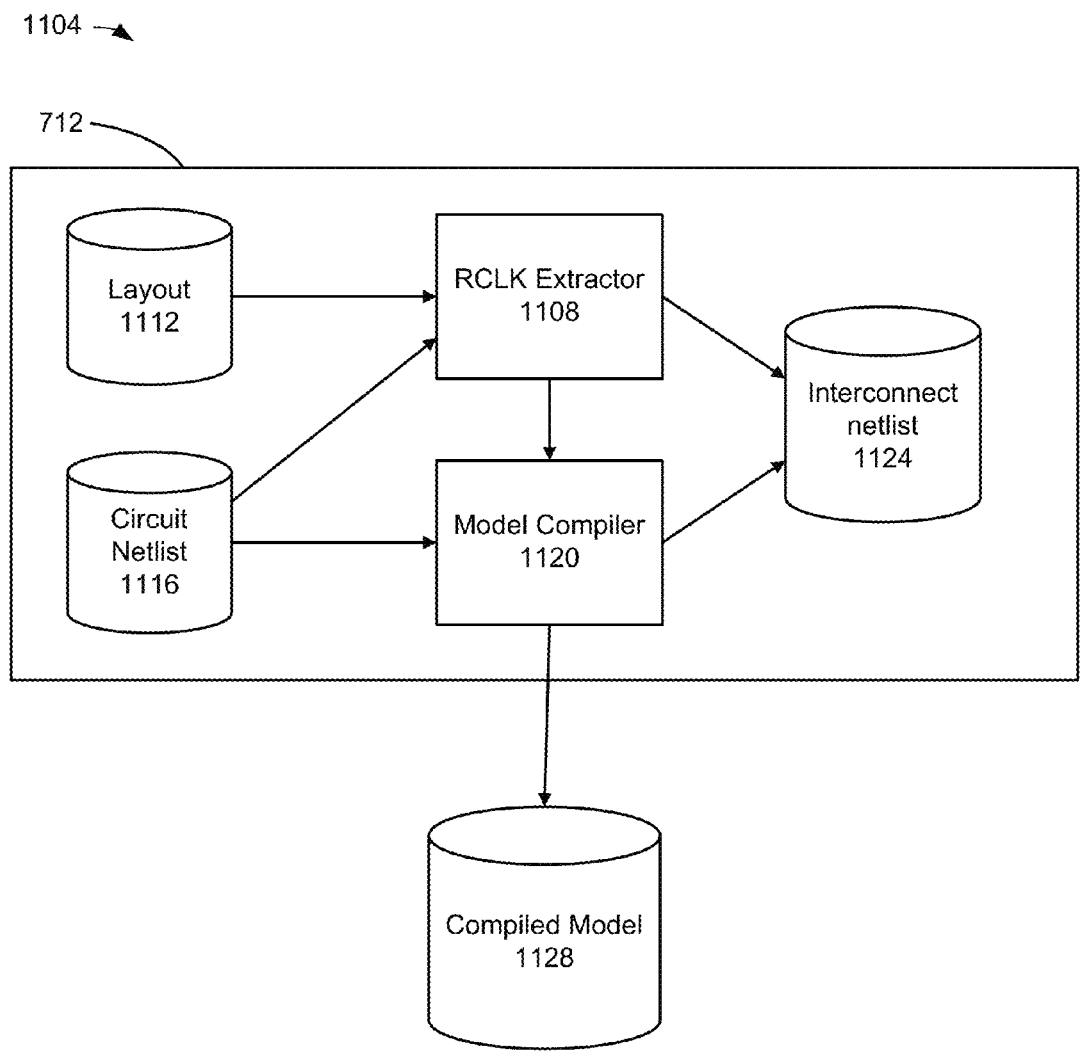
FIG. 11 shows a specific flow for compiling an interconnect model.

FIG. 11 shows a specific flow 1104 for compiling an interconnect model (see step 712 in FIG. 7). Once compiled, the model can be reused in multiple, subsequent simulations without needing to recompile the model again.

In a step 1108, using a layout 1112 and a circuit netlist 1116, the detailed physical interconnect netlist comprised of resistors, capacitors, and inductors is extracted from the layout by an "parasitic" extractor using a foundry technology file which specifies material electrical properties and process layer thicknesses. An extraction netlist is typically stored in a "DSPF" file. A simulation netlist is typically parsed and extracted from the DSPF netlist file. The circuit netlist describes the circuitry to be simulated or evaluated. The layout specifies the geometries of a layout of the circuitry. These geometries include the polygons for the various mask and process layers. The netlist and layout may be stored in a database file. For example, the circuit netlist may be specified using a schematic capture format, hardware description language (HDL) format, register transfer level (RTL) format, or other circuit description language. The layout may be stored in a GDSII format file.

The circuit netlist specifies the components and connectivity of the circuitry. Components can include gates, devices, transistors, cells, logic blocks, input buffers, output buffers, memory cells, decoders, arithmetic logic unit (ALU), and other circuit blocks. The connectivity includes power and ground wiring (carrying respectively, VDD and 0 volts) and the signal interconnect, which carry Boolean signals (representing 0 or 1) that propagate between different logic blocks of the circuitry.

In a step 1120, using the extracted interconnect netlist, the interconnect model is compiled resulting in a computationally fast and complete hierarchical model of the interconnect network. The interconnect netlist can be stored in a file, such as a database file (stored on a hard disk or server) for use by other processes or flows. In a step 1128, the compiled model can be stored in a file, such as in a database file, for use by other processes or flows.

In an implementation, a simulator creates, or "compiles" the interconnect model. This "compiler" can also compile all Monte Carlo subcircuit variants at one time for subsequent use.

Figure 12:
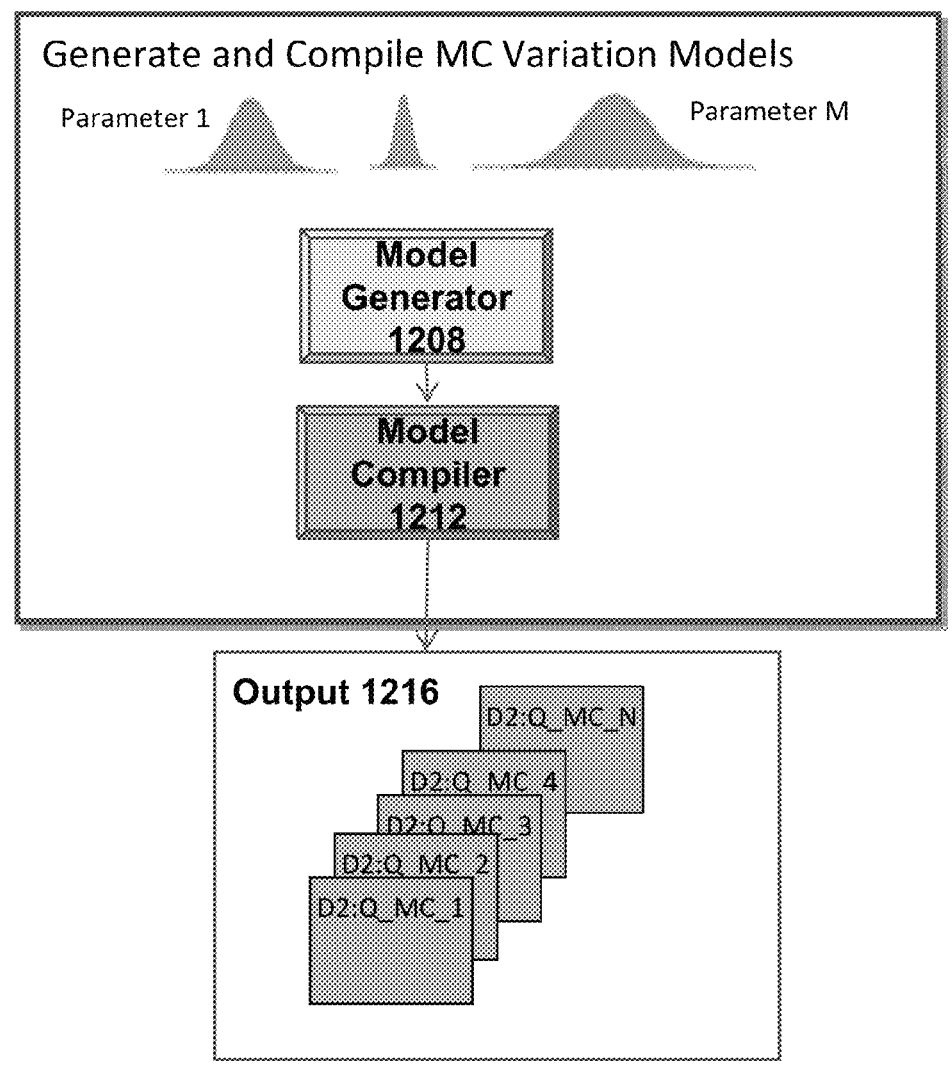
FIG. 12 shows a specific flow for generating and compiling Monte Carlo variation models.

FIG. 12 shows a specific flow 1204 for generating and compiling Monte Carlo variation models (see also step 812 in FIG. 8 and step 1016 in FIG. 10). In a step 1208, a Monte Carlo variation model is generated. After the model is generated, in a step 1212, the Monte Carlo variation models are compiled forming a family of models. In an implementation, a device compiler compiles the Monte Carlo variation models. These models are subsequently used to in a Monte Carlo method by replacing the existing model with one or more of the variation models.

In this application, we refer to a process of solving circuit equations and packaging the results into a compact compiled reusable model as "compiling" the model. We can compile an overall circuit model of a large block comprised of even billions of RCL elements. We can likewise compile subcircuits comprised of just a few or many thousands of elements.

Further, netlist elements in a compiled netlist (or noncompiled netlist) can be replaced with elements, netlists of elements, or compiled netlist models in this approach as provided for by the model previously discussed.

Hierarchical network elements or subcircuits in a database or compiled model can be replaced with alternate elements or subcircuits, database models, or compiled models. The elements or subcircuits are replaced with a more accurate and complete components, thereby creating more accurate results.

Figure 13A:
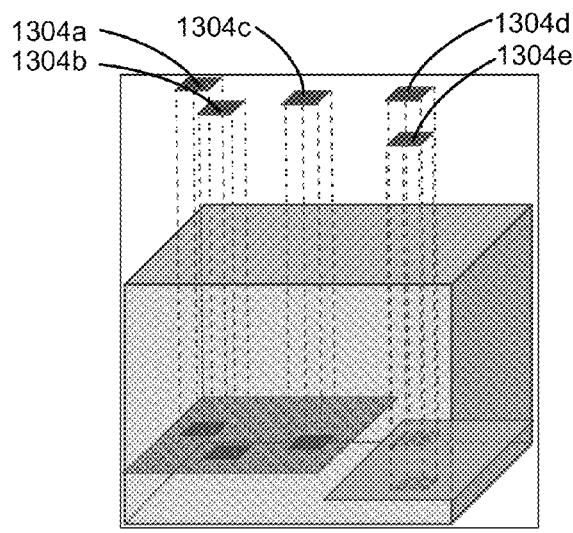
FIG. 13A shows network elements or subcircuits.

FIG. 13A shows network elements or subcircuits 1304a-1304e. These network elements or subcircuits can be updated or replaced through hierarchical ECO. Since a subset of the network is being replaced and the whole network does not need to be recompiled, only a small subset of the network needs to be recalculated. This is fast and efficient. Further, this technique allows for access to all internal nodal or branch values.

In an implementation, this replacement is used in hierarchical Monte Carlo to replace one compiled model netlist elements with others. For the case of vias, in an implementation, a simple model is replaced with a more sophisticated and accurate model which is generated by TCAD process simulation.

Figure 13B:
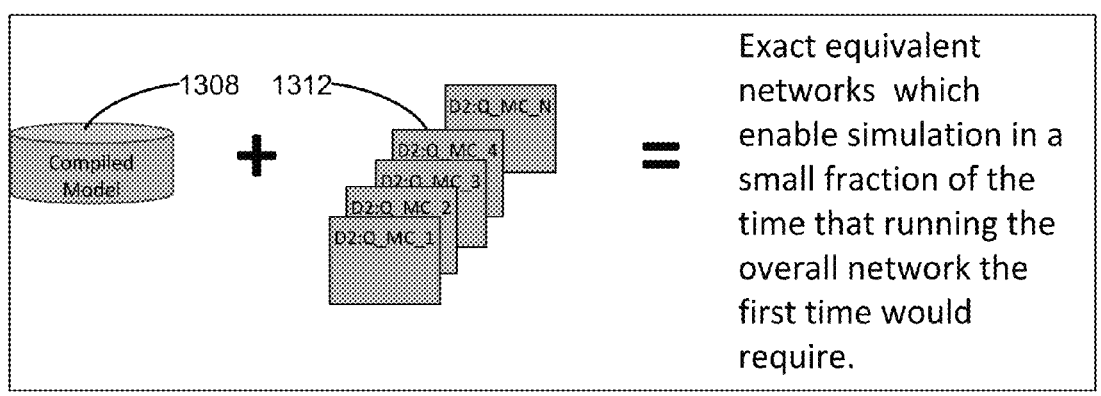
FIG. 13B shows a compiled model and output results from a Monte Carlo model.

FIG. 13B shows a compiled model 1308 and replacement subcircuit models 1312. There is a replacement model in this case for each Monte Carlo iteration. For each Monte Carlo iteration a variant model replaces an existing model. During simulation, only those models which are in a dependency path of this model will require substantial recomputional effort. All other models may be used without extra computational effort to regenerate them. Using the compiled model and the output results, exact equivalent networks enable simulation in a small fraction of the time that running the overall network the first time would require.

Figure 14:
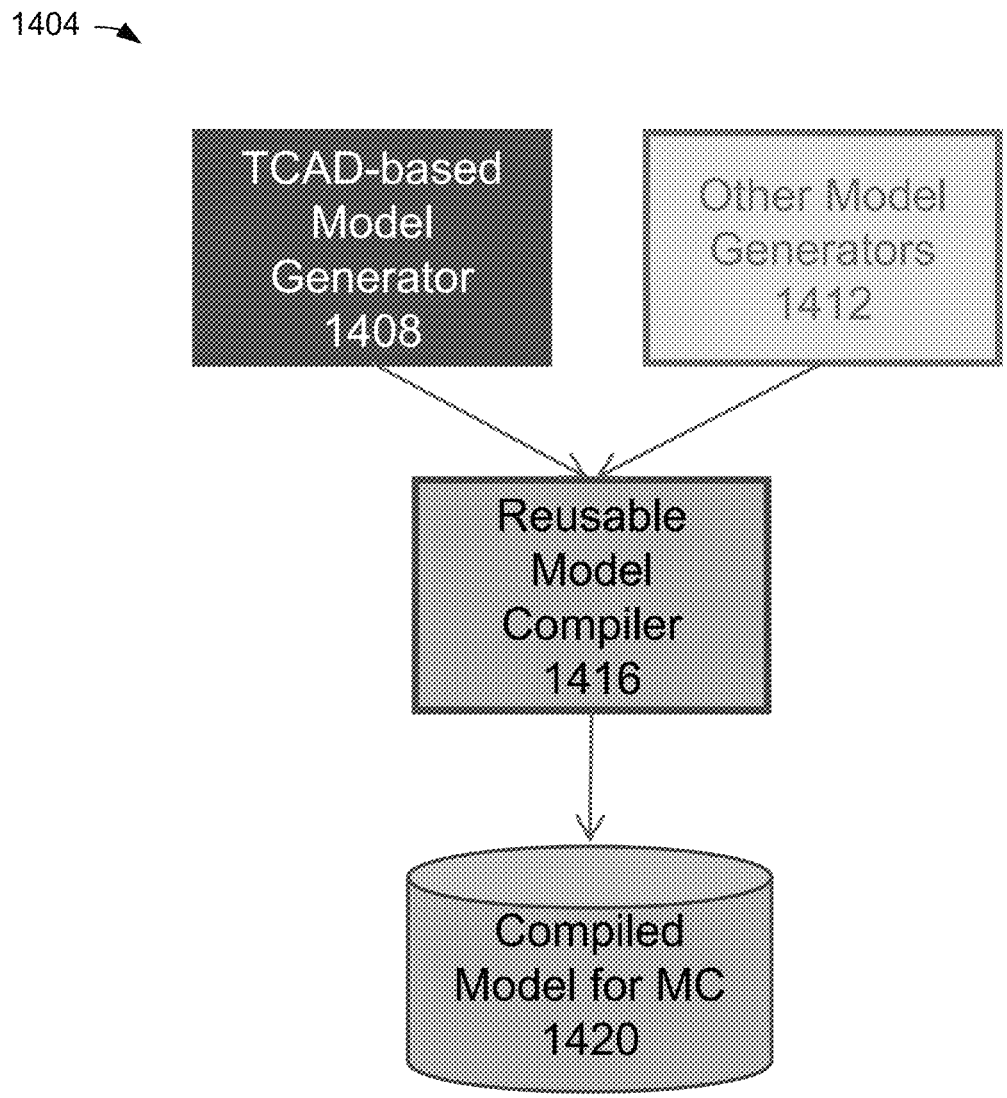
FIG. 14 shows a flow for compiling a model for a Monte Carlo simulation.

FIG. 14 shows a flow 1404 for compiling a model for a Monte Carlo simulation. The hierarchical Monte Carlo approach can be applicable to a physical or parameter variation value which may be cast into a simulation netlist. A physical model generator refers to a program (or flow comprised of a number of programs) which is used to generate a netlist-based model of a physical circuit element or structure.

In FIG. 14, a TCAD-based model generator 1408 and other model generators 1412 are provided. In an implementation, the TCAD-based model generator is used. We can focus on TCAD, physical structure based model generation, or both (any process parameter or process model parameter, physical structure, doping, defect level, or others). Examples of TCAD process-based model generators are:

(1) Lithography, deposition, etch for via distributed RLCK subcircuit generation (2) Lithography, deposition, and etch and gate segmentation for parallel BSIM model subcircuit generation.

In a step 1416, using the TCAD-based model generator, a reusable model compiler is used to compile the model. In a step 1420, the compiled model is stored in a database.

Other types of model generators can also be used to generate models a Monte Carlo simulation. Other types of structure model generators include:

(1) Direct netlist-based model generation (2) Parameterized structure/model model generator (e.g., programmed defects or line width).

Figure 15:
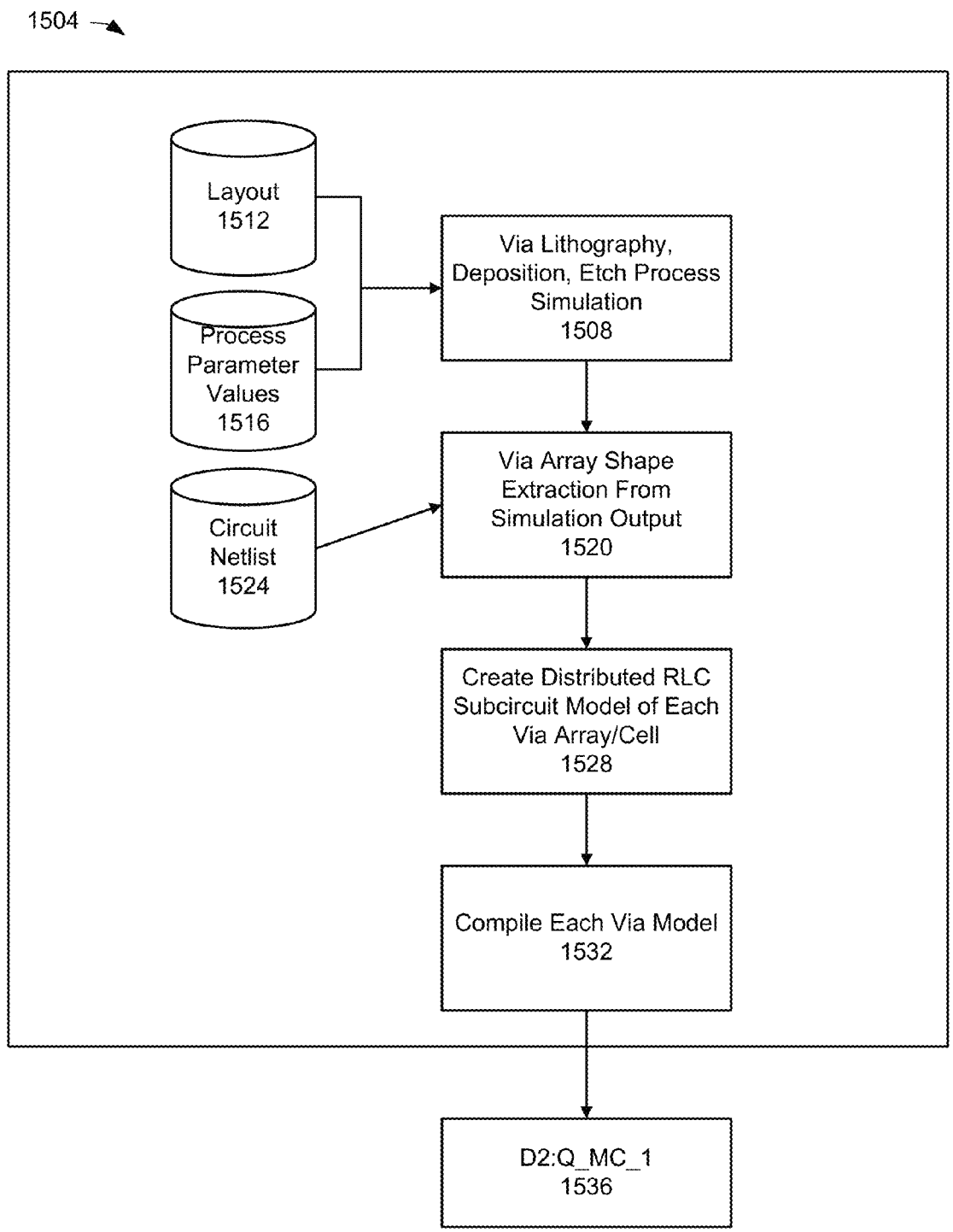
FIG. 15 shows a flow for compiling a via model.

FIG. 15 shows a flow 1504 for compiling a via model. In a step 1508, using layout 1512 and process parameter values 1516 as input, a via lithography, deposition, and etch process simulation is performed. After step 1508, in a step 1520, using circuit netlist 1524 as input, the via array shape is extracted from a simulation output. In a step 1528, a distributed RLC subcircuit model of each via array or cell is created. In a step 1532, each via model is compiled. In a step 1536, the via model is generated and compiled.

In an implementation, the model is generated and compiled using a TCAD-based model generator. In other implementations, a model generator different from a TCAD-based model generator is used.

Figure 16A:
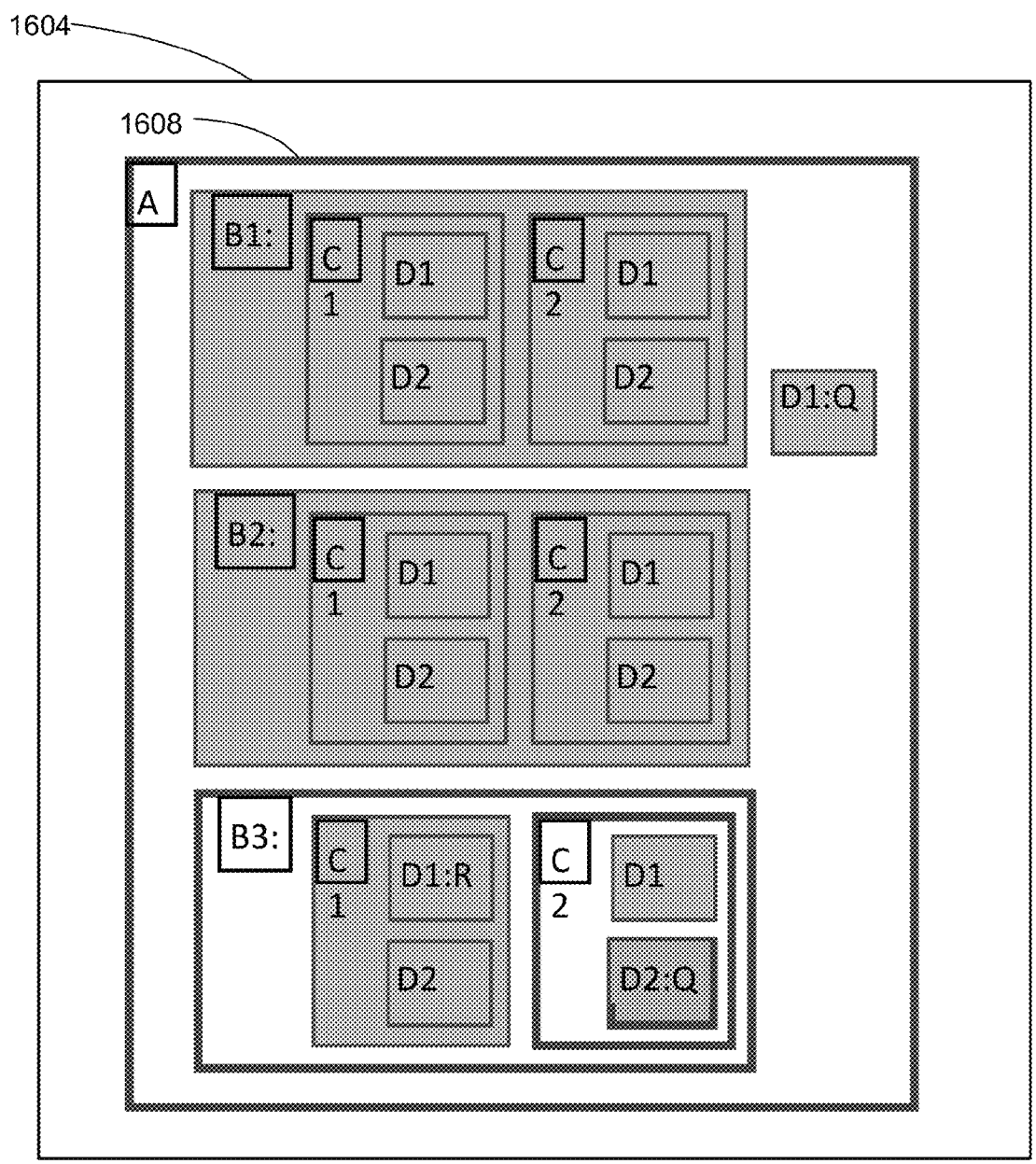
FIG. 16A shows a layout of a circuit having circuit cell blocks.
Figure 16B:
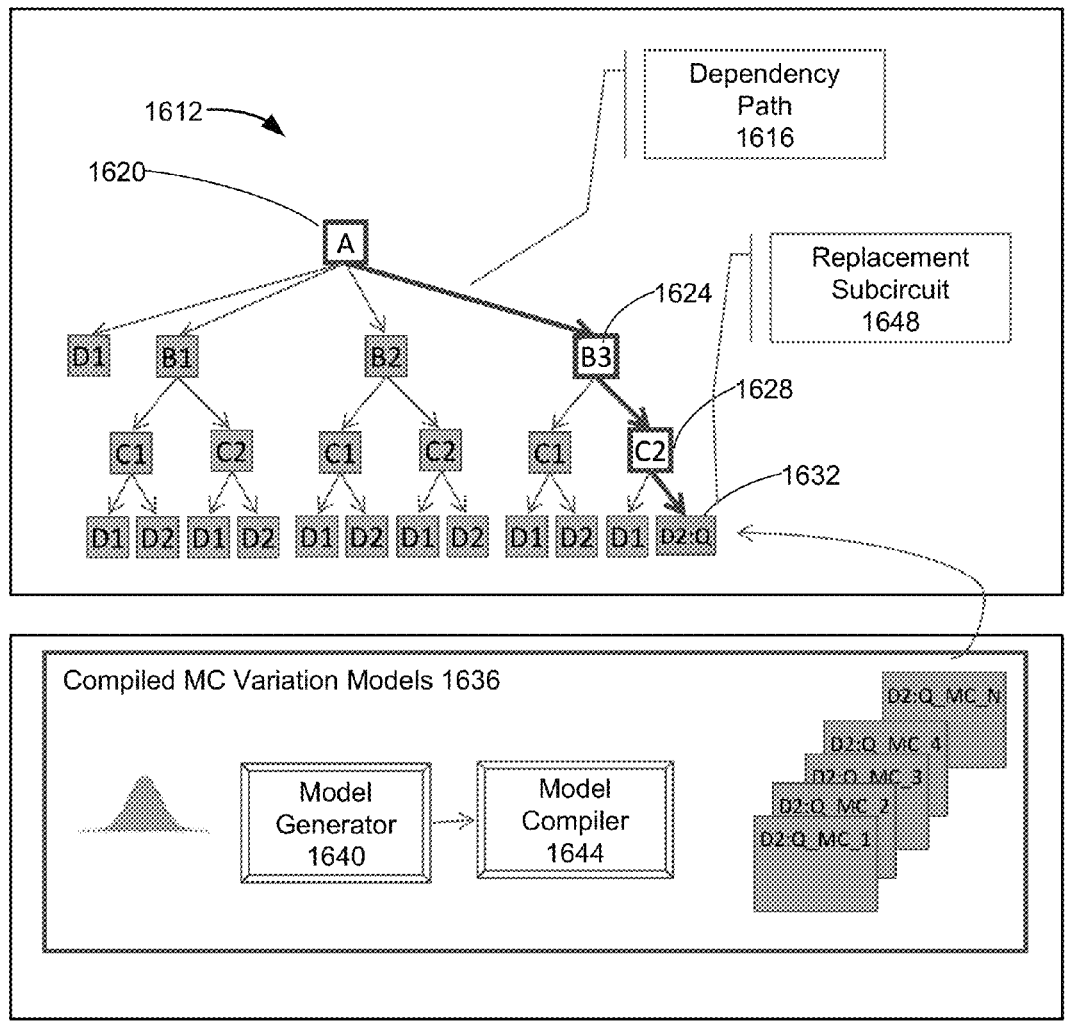
FIG. 16B shows a hierarchical tree structure of the circuit and a hierarchical replacement of subcircuits.

FIGS. 16A-16C show a specific flow for replacing a subcircuit of a hierarchical tree structure of circuit block cells with a compiled model. In FIG. 16A, in a step 1604, a circuit 1608 having circuit cell blocks is provided. Circuit A has a Cell A. Cell A has subcells D1, B1, B2, and B3. Subcells B1 and B2 each have subcells C1 and C2, and these subcells C1 and C2 in subcells B1 and B2 each have subcells D1 and D2. Subcell B3 has subcells C1 and C2. Subcell C1 of subcell B3 has subcell D1:R and D2, and subcell C2 of subcell B3 has subcell D1 and D2:Q.

In FIG. 16B, a hierarchical tree structure 1612 of circuit 1608 of interconnected subcircuits is provided. A hierarchical circuit comprised of interconnected subcircuits can be broken down into separable, independent, and mathematically complete compact subcircuit models which are interconnected. A process of forming this compact model from a traditional subcircuit netlist is referred to as "compiling" a model. This approach also enables dependency path determination. As a result, circuit network problems can be decomposed into independent solution and recomposition of each separable block and interblock connections for a hierarchical method which is "lossless."

A given hierarchical circuit comprised of nested subcircuits can be compiled into a "lossless" and complete circuit model which can subsequently be reused. The advantages to this approach are computational speed and efficiency as well as model transportability without any loss of accuracy. Further, the patent application also describes a circuit being partitioned into smaller simulation blocks prior to simulation and the results reassembled afterwards without any loss of accuracy regardless of partition size. Furthermore, all circuit node boundary conditions are the same regardless of partitioning or the level of abstraction (i.e., a given node at any level of abstraction will have the same voltage), and the node may be "stationary." These fundamentally accurate and partitioned circuits can be computationally distributed across many computational cores or networks connected to computers and the results reassembled without any loss of accuracy. As a result, very large circuits can be simulated by exploiting this inherently "parallel-izable" property without resorting to simplifying and accuracy-reducing compromises such as used in traditional approaches.

A technique of this application exploits these capabilities and properties to enable a hierarchical, parallel, and distributed Monte Carlo technique capable of simulating large circuits or simulating circuits at a higher speed than previously possible.

As shown in FIG. 16B, Monte Carlo variable circuit elements or subcircuits in the hierarchy are identified. This may be one specific instance or all instances of a hierarchical subcircuit. An aspect of hierarchical Monte Carlo is that it enables any variant of a subcircuit to easily and quickly replace an original subcircuit in the database of an already-solved circuit without a substantial loss of prior computational effort and effort on the unaffected subcircuits. Only variant branches and any other branches impacted require additional computational effort to achieve the overall new circuit solution. As a result, the approach allows far faster and more computationally efficient variant-circuit simulations than if the entire network were recomputed.

In other words, for the hypothetical case of a very large hierarchical network which takes perhaps one or more hours to solve and perform a simulation, replacing a given hierarchical subcircuit with a variant of that subcircuit and then rerunning that same simulation would only take a small fraction of this time, say just a few minutes or even less, seconds. This is due to the fact that typically only a small number of hierarchical branches and cells will be recomputed. The subcircuits that require recomputation following a hierarchical replacement are determined by dependency path analysis. Only those subcircuits which lie along the dependency path will be involved in the computations required for the new solution. The solutions for subcircuits elsewhere can be reused.

In FIG. 16B, a dependency path 1616 includes cell A 1620, subcell B3 1624, subcell C2 1628, and subcell D2:Q 1632. Dependency path 1616 is indicated by a bolded border around the cell and subcells, and bolded lines linking the bolded cell and subcells together.

Cells D1, B1 and the subcells below it in the hierarchical tree structure, B2 and the subcells below it in the hierarchical tree structure, subcell C1 of cell B3, subcells D1 and D2 of subcell C1 of cell B3, and subcell D1 of subcell C2 of subcell B3 are nondependent subcircuits. The nondependent subcircuits are interconnected subcircuits that are not part of dependency path 1616.

In an implementation, reusable compiled library modules are generated by compiling the nondependent subcircuits. These reusable compiled library modules can then be used following a hierarchical replacement of the subcircuits in the hierarchical tree structure. Once compiled, the library modules can be reused in multiple, subsequent simulations without needing to recompile the modules again.

In a step 1636, compiled Monte Carlo subcircuit models with characteristics that span the Monte Carlo variation range are generated. In an implementation, a model generator 1640 generates a subcircuit model with characteristics that span the Monte Carlo variation range, and a model compiler 1644 compiles the subcircuit model.

In a step 1648, a hierarchical replacement of the Monte Carlo model is performed. In this implementation, subcircuit D2:Q 1632 is being replaced by the compiled Monte Carlo subcircuit models in step 1636. In an implementation, the hierarchical replacement of the Monte Carlo model is performed sequentially. In another implementation, the hierarchical replacement of the Monte Carlo model is performed in parallel. As shown in FIGS. 16A-16B, this solution resolves dependencies along a well defined path (e.g., dependency path 1616). In general the dependency path may be more complex than illustrated.

In other words, for a large circuit in which we desire to change or dither one or more parameter values of a given circuit element or network of circuit elements such as the resistance value and width of a resistor in the network, or a set of RCL values and corresponding width, thickness, or length values of an interconnect subcircuit, this circuit modification can be efficiently performed thousands or even millions of times due to the fact that only those subcircuits which depend upon the modified circuit elements need to be recomputed. For all others, prior computational results can be reused with absolutely no loss of accuracy. Dramatic speedups are possible with this approach enabling the practical use of hierarchical Monte Carlo for variation-aware modeling of large hierarchical integrated circuits.

Figure 17:
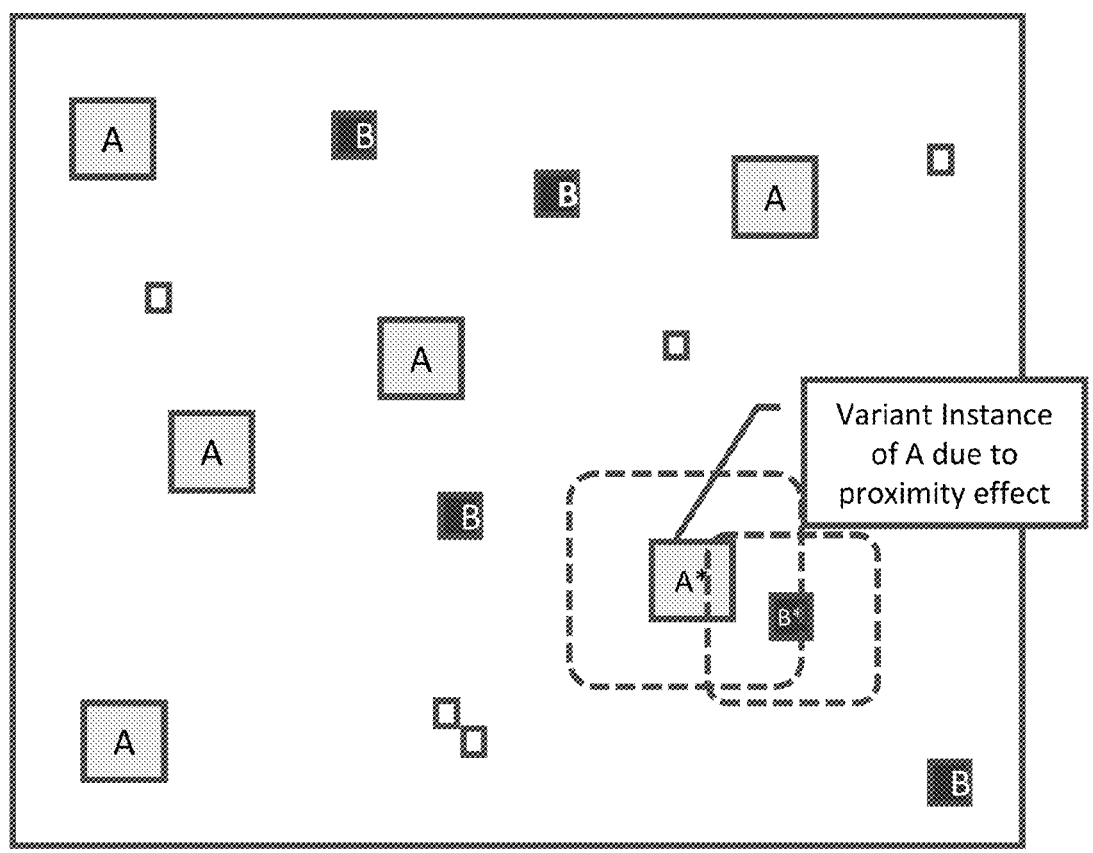
FIG. 17 shows variant instances due to proximity-effect interactions.

FIG. 17 shows hierarchical variant instances due to proximity-effect interactions. Process proximity effects span mask manufacturing and silicon manufacturing, which include electron beam effects and thermal history, optical proximity, microloading during etch, deposition, or both.

In an implementation, vias are classified for reusable via model generation. A set of variant instances associated with an attribute is determined. Some instances will be different due to process proximity effects. We should not limit ourselves to spatial process-proximity effects as numerous cross-coupling effects come into play due to multiple physical interactions. Models are simulate, generate, and compiled into a library. For densely compacted vias there may be many variants. For sparsely compacted vias there may be very few variants. In the figure, the variant vias will be spatially annotated for correct placement in the net.

In this implementation, vias were describes. But the technique has general application to FETs and other structures.

Figure 18:
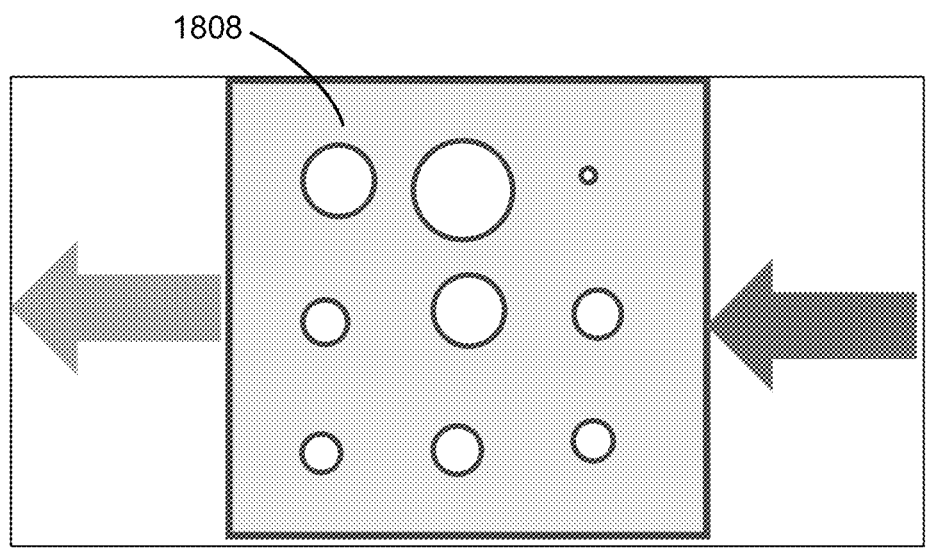
FIG. 18 shows how a general connection is handled in a sample chip.

FIG. 18 shows how a general connection is handled. Wire connections to a model 1808 are spatially dependent so as to handle any spatially-depended current effects. U.S. provisional patent application 61/313,566, filed Mar. 12, 2010 describes details of a connection made to ports that exist on sides of a cell. Model 1808 can be used to enable hierarchical reuse for wire connection cases.

Figure 19:
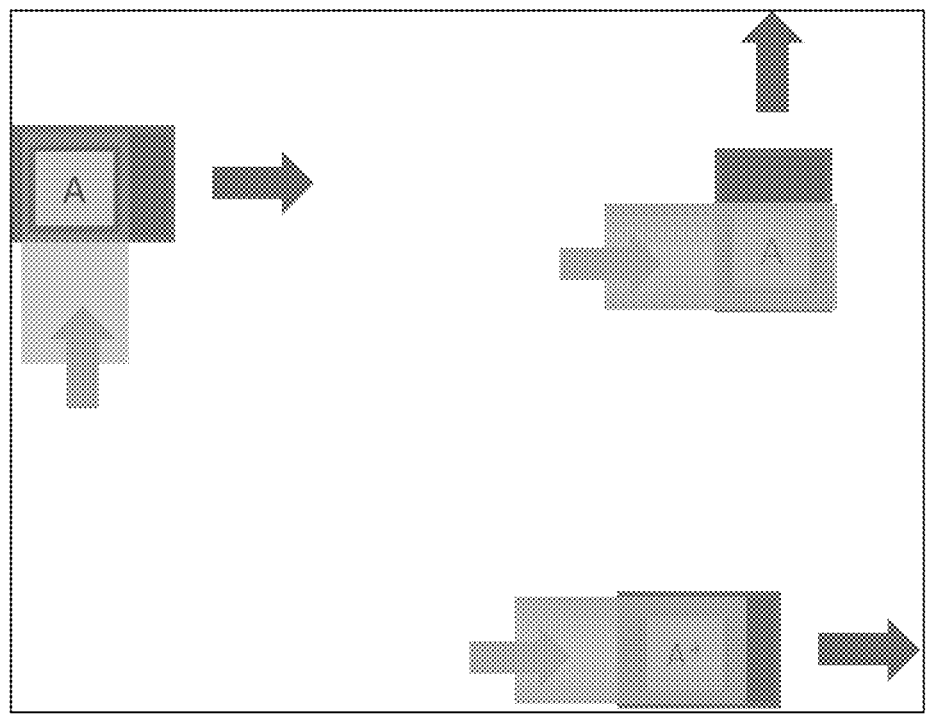
FIG. 19 shows, for a single input current, variations in current distributions in a model.

FIG. 19 shows, for a single input current, variations in current distributions in a model 1808. Depending on the direction current flows through model 1808, the same model will have a different resistance profile. This will affect performance.

Figure 20:
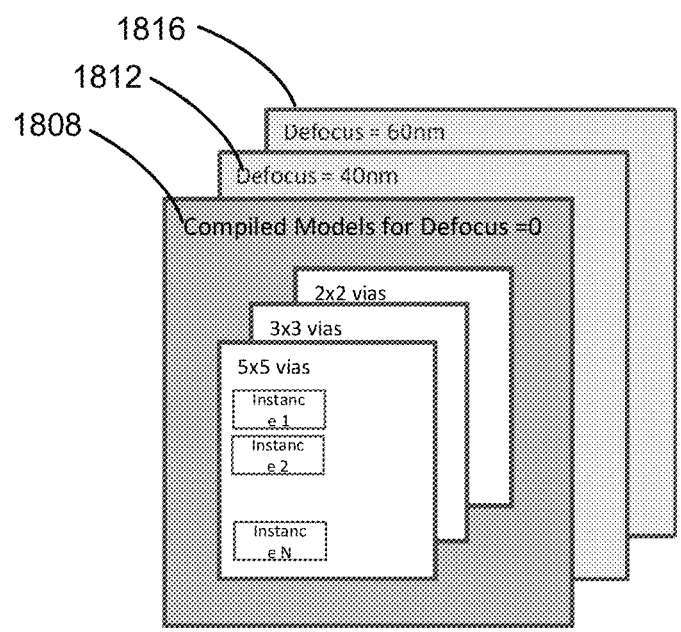
FIG. 20 shows compiled models for different values of lithographic defocus.

FIG. 20 shows compiled models for different values of lithographic defocus. In a compiled model 2008, defocus is equal to 0; in a compiled model 2012, defocus is equal to 40 nanometers; and in a compiled model 2016, defocus is equal to 60 nanometers. One may use these models as Monte Carlo replacement models to determine the impact of defocus on the functional performance of the IC.

In an implementation, the compiled models are Monte Carlo via models. The Monte Carlo via models are sequentially and "in-line" setup. The via models are replaced, and this is scheduled for the cases.

In another implementation, the Monte Carlo models are set up first. After the Monte Carlo models are set up, the models are distributed across a computational network of multicore processors. For example, for "n" number of Monte Carlo runs across a given via parameter space "P," families of compiled via cells are generated for each parameter variation. For each parameter variation, a hierarchical compiled model replaces a model and a distributed job is scheduled. For example, see U.S. Pat. No. 7,827,016, issued Nov. 2, 2010, and U.S. patent application Ser. Nos. 11/421,212, filed May 31, 2006, and 12/915,362, filed Oct. 29, 2010, which are incorporated by reference. The technique of the invention can work in conjunction with the techniques described by these patent applications.

Due to the speed and efficiency of hierarchical Monte Carlo, there may not be much difference. For a large number of Monte Carlo iterations, there are advantages in developing hierarchy wherever possible.

A technique of this invention can be applied in various scenarios.

(1) "What-if" analysis. For example, a question could be "How would a different mask or process technology impact the parametric yield of my integrated circuit?"

(2) Cluster analysis. For example, a question could be "What is the common cause failure mechanism for a complex yield reduction dynamic?"

(3) Sensitivity analysis. For example, a question could be "What are the most sensitive current transport network elements and what are their spatial locations on the layout?"

(4) Timing analysis. For example, a question could be "How will timing be impacted by typical manufacturing variations such as dummy fill closeness to critical timing nets?"

Leakage can be a problem that has become a source of design-related yield loss. Strategies may explored for minimizing leakage through hierarchical Monte Carlo.

Figure 21A:
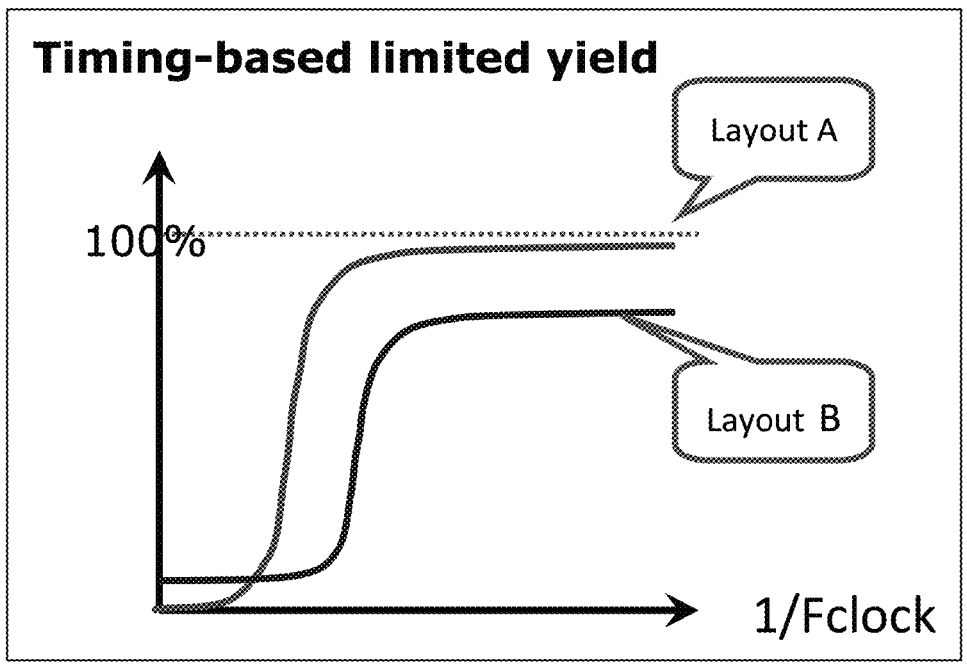
FIG. 21A shows a graph of two layouts relating time in 1/F clock to yield percentage using electrical design for manufacturing through variation-aware modeling.

FIG. 21A shows a graph of a layout A and a layout B relating time in 1/F clock frequency to yield percentage. As shown in the graph, the limited-yields of layout A and layout B are significantly different. This deterministic quantification based upon layout variations provides a very useful means for design space exploration and design optimization.

In FIG. 21A, electrical design for manufacturing (eDFM) through variation-aware modeling (VAM) is implemented. A person can ask and answer important DFM questions on electronic functional and parametric limited yield basis. A question like "How does a specific layout modification or silicon image or architectural change impact timing-based and leakage-based limited yields?" can be answered. It is desirable for the results to be SPICE accurate and deterministic.

Figure 21B:
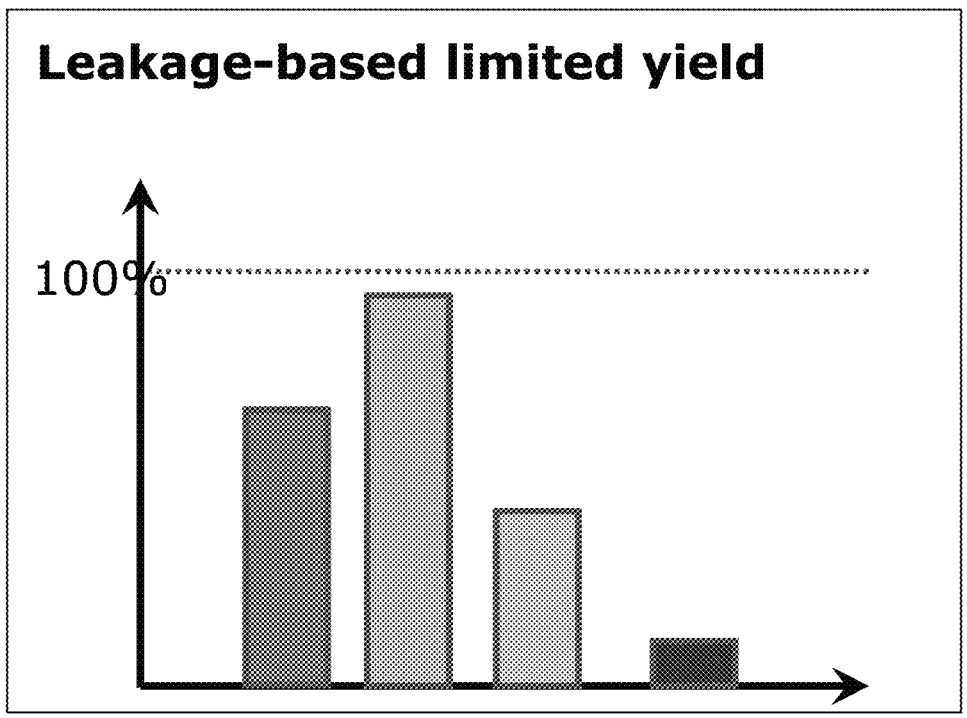
FIG. 21B shows a graph of the leakage-based limited yield.

FIG. 21B shows a graph of leakage-based limited yield.

Figure 22A:
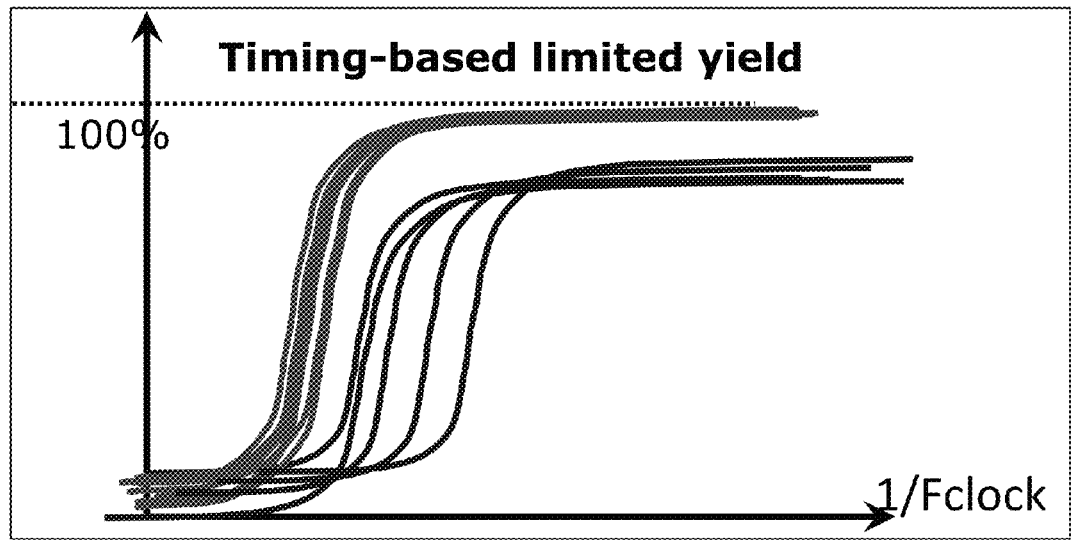
FIG. 22A shows a graph of layouts of a circuit relating time in 1/F clock to yield percentage using variation-aware modeling through hierarchical Monte Carlo.

FIG. 22A shows a graph of layouts of a circuit relating time in 1/F clock to yield percentage. In FIG. 22A, variation-aware modeling (VAM) through hierarchical Monte Carlo is implemented. Hierarchical Monte Carlo enables millions of Monte Carlo cases or sweeps to be performed on large blocks. This enables accurate determination of statistical spread, sensitivity, and outliers. This is a comparative for "what-if" analysis, and is a design under multi-variation uncertainty. Such questions as "What is the yield impact of a 15 percent VDD random voltage variation on individual nodes or cells?" and "What is the yield for a supply rail voltage of 0.9 volts? . . . for 1.2 volts?" can be answered.

The present invention solves many problems. For example, very large circuits can now be analyzed across a range of parameter variations without compromising accuracy. These results can convey design-process sensitivities, practical usable process windows, operational margins, environmental margins, and many other factors. Further, clock tree and signal timing analysis can be done without resorting to overly aggressive and simplistic assumptions such was done with statistical static timing analysis.

Figure 22B:
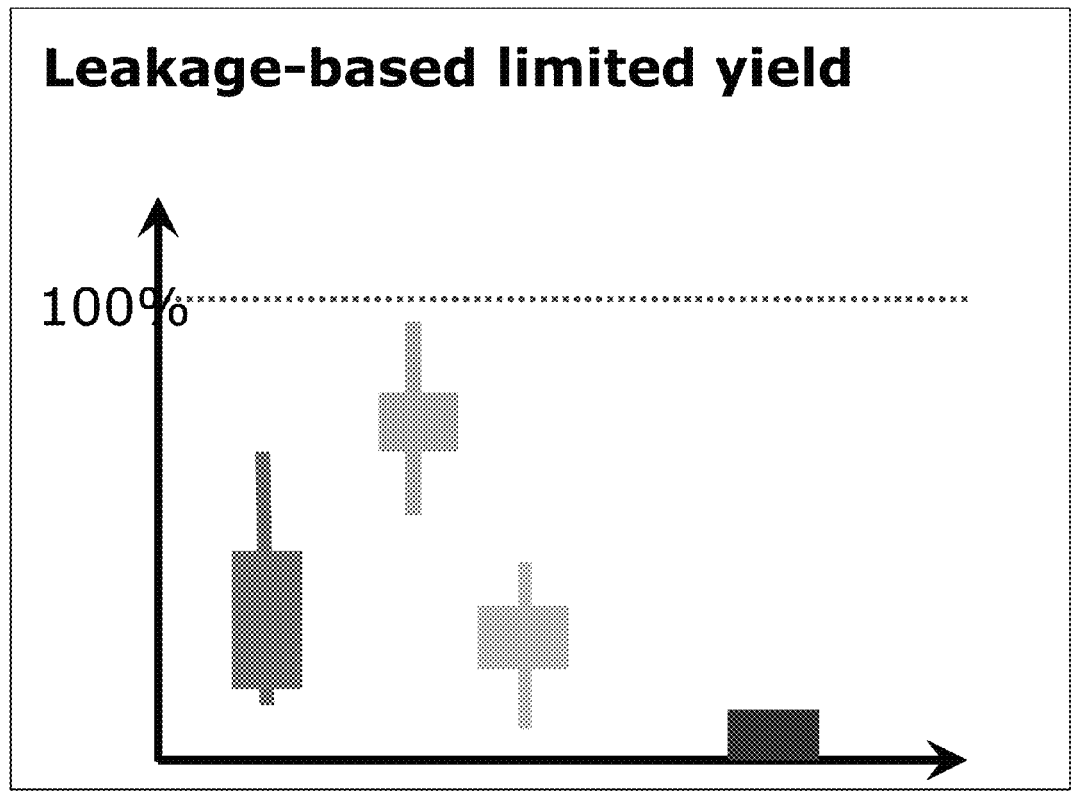
FIG. 22B shows a graph of the leakage-based limited yield.

FIG. 22B shows a graph of leakage-based limited yield.

A technique of this invention can be used to enable mask change ECOs. A systematic means can be used to justify ECO changes to an integrated circuit product in production in terms of yield metrics. Given the power and accuracy of hierarchical SPICE-accurate simulation methods described in this application, it is possible to assess the impact of mask changes on performance and yield. Further, it is possible to provide information that will quantify risk or reward benefit for making a mask change.

Further, the implementation is a tool for IP block technology development and design-process exploration to optimize a reusable block for a given process or processes and to reduce the amount of worst-case guard-banding that is prevalent in today's designs. Furthermore, it can also be used for a DFM signoff to validate the inherent robustness of the design or redesign.

Further, extractor or analysis roughness may include these criteria:

(1) Extraction models fine enough to probe the operative physics in play. For example, impedance discontinuities which can result in significant IR drop (such as a change in current or voltage) or wavefront reflection or transmission difference, and spatial wire narrowing which can result in increased current density impacting electromigration, thermal, and lifetime.

(2) Pattern-Limited Yield Issues

Typically this is a fundamental problem for simulators due to capacity, data path, or speed. As a result they overreduce or reduce on the wrong physical basis.

The hierarchical Monte Carlo approach is useful in many domains. For example:

(1) Physical variations arising from and process variations. For example to assess the impact of random process variations.

(2) Temporally. For example to asses the impact of a statistically varying voltage pulse applied to one or more nets (e.g., timing analysis)

(3) Parametrically. To assess the impact of environmental or process parameter variations which may arise in field use of the product.

(4) Can be done all at once

Many different netlist elements can be varied within the hierarchical Monte Carlo method. Importantly, we may modify any of these elements in the generated models if they exist for computational efficiency. These elements may include resistors, capacitors, inductors, or voltage or current source elements. Any number of these may be varied or added or removed at a time with hierarchical replacement, addition, or replacement operations. Additionally, whole subcircuits may be varied, added, or removed similarly in the method. So, for example the resistance value may be varied directly, additional resistance values may also be added in parallel, or a given resistor may be replaced with a subcircuit. Likewise the element value or initial condition charge of a given capacitor may be varied or that capacitor may be replaced with a subcircuit.

Both design level netlists as well as netlists obtained by parasitic extraction may be used in a Monte Carlo simulation. For the first, a designer may wish to determine the sensitivity of his circuit to resistance and capacitive loading to determine the placement of repeaters. For the second, a designer may wish to verify that a physical circuit extracted from a particular layout is robust and will operate within design specification over a range of resistance or capacitance or source variations. The netlist may be in a traditional hierarchical SPICE-like format, an extractor-like format such as DSPF, or other similar hierarchical formats used for circuit simulation.

There are cases in which an external extraction tool or TCAD simulation tool must be used within the hierarchical Monte Carlo method in order to vary the model parameter of interest.

Such is the case when we desire to vary one or more physical feature geometries on the physical layout. For example, perhaps we desire to vary a wire width. Here, after a layout feature is varied in accordance with our Monte Carlo method we may either re-extract the entire netlist or incrementally extract the netlist for the specific feature or net and replace the original extraction netlist with the new incrementally extracted feature netlist. In such as case, we can generate all variant instance models at once so that during the Monte Carlo simulation, it is only required to replace the corresponding models sequentially. In this manner one can even change process parameters such as described in the extractor technology file provided by the fabrication foundry. For example, the thickness or resistivity of a metal layer may be changed in the extractor's technology file.

For other process parameter variations, a TCAD process simulation may be required. TCAD simulators enable simulation of the IC fabrication based upon process parameters. So one may simulate the actual shapes that would be printed on silicon for example. If we were to generate accurate silicon image shapes of wiring or via shapes we could then extract the more accurate parasitic netlist from these silicon image shapes. Here, the physical layout features that extracted from the so-called "silicon image" results from simulation of what would be printed on a silicon wafer with given layout features combined with their RET features. The silicon image can be significantly distorted from the design level layout which is the ideal shapes we would desire to print on the silicon wafer. The thickness of the various layers may also be determined through experimentally calibrated simulations of the planarization and deposition/etch processes. Process parameter variations may be simulated in this manner. Process parameter variations may also be changed in a relative manner ranging from simply changing the impedance of a net by a percentage value. Relative resistance or capacitance variation can be easily simulated in this manner.

We may also wish to simulate the impact of random or systematic current or voltage noise injection due to various physical effects by adding an artificial current or voltage source such as occurs from the silicon effects; high energy particles such as gamma particles, dark current noise or other noise injection, charge injection from traps, charge injection due to leakage, unattributed sources of substrate noise current injection. This type of analysis may be performed as well with the hierarchical Monte Carlo method.

There are endless reasons for performing a Monte Carlo simulation.

Here are few reasons why a designer would like to perform a variation analysis or verification simulation on the specific case of interconnects.

Metal interconnects conducting power or clock, logic, or analog signals, despite being fabricated in metals typically considered highly conductive are actually quite resistive and a typical net may conduct current over many different physical layers connected by interconnect vias. The via structures are also quite resistive. These interconnects additionally have a large distributed capacitance with coupling to many adjacent conductors. This impedance can impact the static and dynamic IR voltage drop along the length of the power interconnect wiring thereby impacting the device powered and causing failures or performance loss. Furthermore, the resistivity of the metal wire is strongly affected by the local temperature. As wire temperature goes up the resistance does as well. For other interconnects, the parasitic capacitive coupling may impact signal fidelity in the network or in the network capacitively coupled to. For each of these cases one can easily see that it is valuable to be able to dither the impedance values to verify circuit robustness over these variations.

Another example deals with the very high current densities in small features. Current density, the current normalized to the area it passes through, is a key factor impacting IC reliability. When current density is high for a given layer feature or interconnect anywhere along a given net, the likelihood for failure increases dramatically. The local temperature is also a key contributor along with current density to electro-thermal migration failure.

The industry has found that vias are a principle failure mechanism due to lithographic patterning, particulate defects, as well as high-current density-driven electromigration. A designer may mitigate these failures by using redundant vias to provide multiple current conduction paths. If one is blocked then one or more others are still likely to work. However, there has not been a good means to determine the optimal number of these redundant vias. Typically, a heuristic model is used to describe where to double up the vias.

The simulator we have discussed provides an accurate means to verify every via of a layout, even if there are billions, due to its ability to hierarchically model the network including all vias.

Previously, dummy fill layout features were discussed as a common means to help planarize the surface of an IC during fabrication. The consequence of these artificial features is that they can impact critical signal nets due to parasitic capacitive coupling to critical nets. So, judicious tradeoff must be made between optimal planarization and signal integrity. Unfortunately, designers typically ignore the impact of these dummy fill features during design due to the inability of typical simulation tools to both handle the huge number of fill cells as well as their inability model floating capacitors. Significant performance variation from the designed value may result. A great advantage of the hierarchical methods discussed here is that the fill cells may be handled hierarchically and very efficiently. As a result, it is possible to perform Monte Carlo simulation very effectively to analyze the impact of these features on signal integrity. In such a simulation one could easily change the method of area fill or the distance of area fill from critical nets.

In this application, we focused on physical variations particularly those which arise from process variations modeled using TCAD-based compiled models. We can also vary timing pulses, BSIM values at the same time, and can also insert things like random defects.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
providing an extraction of an integrated circuit design;
using the extraction, compiling an interconnect model comprising circuit blocks of the integrated circuit design arranged in a hierarchical tree structure;
allowing selecting of a netlist element parameter for variation, wherein the netlist element parameter comprises at least one of an impedance value, voltage source value, or current source value;
calculating a first value for the netlist element parameter for variation;
calculating a second value for the netlist element parameter for variation;
using at least one processor, using the interconnect model and the first value for the netlist element parameter, performing a first circuit simulation of the integrated circuit design and saving results for each of the circuit blocks of the hierarchical tree structure;
with the second value, identifying circuit blocks of the hierarchical tree structure that are affected by the change in the netlist element parameter, including circuit blocks in a dependency path of the affected circuit blocks, as affected circuit blocks, wherein other blocks which are not affected are unaffected circuit blocks and the affected circuit blocks are a subset of a total number of circuit blocks; and
using at least one processor, using the interconnect model and the second value, performing a second circuit simulation of the integrated circuit design, the second circuit simulation being subsequent to the first circuit simulation, by calculating results for the affected circuit blocks while reusing the results for unaffected blocks from the first circuit simulation,
wherein the allowing selecting of a netlist element parameter for variation, wherein the netlist element parameter comprises at least one of an impedance value, voltage source value, or current source value comprises:
allowing selecting of two or more netlist element parameters for variation, wherein the netlist element parameter is a first netlist element for variation, and the first value and second values are for the first netlist element;
calculating a third value for a second netlist element parameter for variation;
calculating a fourth value for the second netlist element parameter for variation,
wherein for the first circuit simulation, the first value is used for the first netlist element parameter and the third value is used for the second netlist element parameter, and
for the second circuit simulation, the second value is used for the first netlist element parameter and the third value is used for the second netlist element parameter;
with the first and fourth values, identifying circuit blocks of the hierarchical tree structure that are affected by the change in the netlist element parameter, including circuit blocks in a dependency path of the affected circuit blocks, as affected circuit blocks, wherein other blocks which are not affected are unaffected circuit blocks and the affected circuit blocks are a subset of a total number of circuit blocks;
using the interconnect model and the first and fourth values, performing a third circuit simulation of the integrated circuit design, the second circuit simulation being subsequent to the first circuit simulation, by calculating results for the affected circuit blocks while reusing the results for unaffected blocks from at least one of the first or second circuit simulations;
with the second and fourth values, identifying circuit blocks of the hierarchical tree structure that are affected by the change in the netlist element parameter, including circuit blocks in a dependency path of the affected circuit blocks, as affected circuit blocks, wherein other blocks which are not affected are unaffected circuit blocks and the affected circuit blocks are a subset of a total number of circuit blocks; and
using the interconnect model and the second and fourth values, performing a fourth circuit simulation of the integrated circuit design, the second circuit simulation being subsequent to the first circuit simulation, by calculating results for the affected circuit blocks while reusing the results for unaffected blocks from at least one of the first, second, or third circuit simulations.

2. The method of claim 1 wherein the netlist element parameter for variation comprises a resistance.

3. The method of claim 1 wherein the netlist element parameter comprises a device sizing.

4. The method of claim 1 wherein the netlist element parameter comprises a sizing of a via cell.

5. The method of claim 1 wherein results of the second circuit simulation when compared to the first circuit simulation compare a timing change resulting from a change from the first value to the second value.

6. The method of claim 1 wherein results of the second circuit simulation when compared to the first circuit simulation compare an IR drop change resulting from a change from the first value to the second value.

7. The method of claim 1 wherein the first netlist element parameter for variation comprises a resistance value and the second netlist element parameter comprises a voltage source variation.

8. The method of claim 1 wherein the first netlist element parameter for variation comprises an impedance value and the second netlist element parameter comprises a device sizing.

9. The method of claim 1 comprising:
allowing selecting of a first net of the netlist where the netlist element parameter is to be varied according to the first value and the second value, while the netlist element parameter is not varied on a second net of the netlist, wherein the first net is different from the second net.

10. The method of claim 1 comprising:
allowing selecting of a first net of the netlist where the first netlist element parameter is to be varied according to the first value and the second value, while the first netlist element parameter is not varied on a second net of the netlist, wherein the first net is different from the second net; and
allowing selecting of the second net of the netlist where the second netlist element parameter is to be varied according to the third value and the fourth value, while the second netlist element parameter is not varied on the first net of the netlist.

11. The method of claim 1 wherein the compiling an interconnect model comprising circuit blocks of the integrated circuit design arranged in a hierarchical tree structure comprises:
identifying fill cells of the integrated circuit design and inserting parasitics into the hierarchical tree structure resulting from the fill cells on nets of the integrated circuit design,
wherein the netlist element parameter for variation comprises a fill cell parameter.

12. A method comprising:
providing an extraction of an integrated circuit design;
using the extraction, compiling an interconnect model comprising circuit blocks of the integrated circuit design arranged in a hierarchical tree structure;
allowing selecting of a process parameter for variation;
determining a first value for the process parameter for variation;
determining a second value for the process parameter for variation;
using at least one processor, using the interconnect model and the first value for the process parameter, executing a first circuit simulation of the integrated circuit design and saving results for each of the circuit blocks of the hierarchical tree structure;
with the second value, identifying circuit blocks of the hierarchical tree structure that are affected by the change in the process parameter, including circuit blocks in a dependency path of the affected circuit blocks, as affected circuit blocks, wherein other blocks which are not affected are unaffected circuit blocks and the affected circuit blocks are a subset of a total number of circuit blocks; and
using at least one processor, using the interconnect model and the second value, executing a second circuit simulation of the integrated circuit design, the second circuit simulation being subsequent to the first circuit simulation, by calculating results for the affected circuit blocks while reusing the results for unaffected blocks from the first circuit simulation,
wherein the allowing selecting of a process parameter for variation comprises:
allowing selecting of two or more process parameters for variation, wherein the process parameter is a first process element for variation, and the first value and second values are for the first process element;
calculating a third value for a second process parameter for variation;
calculating a fourth value for the second process parameter for variation,
wherein for the first circuit simulation, the first value is used for the first process parameter and the third value is used for the second process parameter, and
for the second circuit simulation, the second value is used for the first process parameter and the third value is used for the second process parameter;
with the first and fourth values, identifying circuit blocks of the hierarchical tree structure that are affected by the change in the process parameter, including circuit blocks in a dependency path of the affected circuit blocks, as affected circuit blocks, wherein other blocks which are not affected are unaffected circuit blocks and the affected circuit blocks are a subset of a total number of circuit blocks;
using the interconnect model and the first and fourth values, performing a third circuit simulation of the integrated circuit design, the second circuit simulation being subsequent to the first circuit simulation, by calculating results for the affected circuit blocks while reusing the results for unaffected blocks from at least one of the first or second circuit simulations;
with the second and fourth values, identifying circuit blocks of the hierarchical tree structure that are affected by the change in the process element parameter, including circuit blocks in a dependency path of the affected circuit blocks, as affected circuit blocks, wherein other blocks which are not affected are unaffected circuit blocks and the affected circuit blocks are a subset of a total number of circuit blocks; and
using the interconnect model and the second and fourth values, performing a fourth circuit simulation of the integrated circuit design, the second circuit simulation being subsequent to the first circuit simulation, by calculating results for the affected circuit blocks while reusing the results for unaffected blocks from at least one of the first, second, or third circuit simulations.

13. The method of claim 12 comprising:
allowing selecting of a first net for variation where the process parameter is to be varied according to the first value and the second value, while the process parameter is not varied on a second net, wherein the first net is different from the second net.

14. The method of claim 12 wherein the compiling an interconnect model comprising circuit blocks of the integrated circuit design arranged in a hierarchical tree structure comprises:
identifying fill cells of the integrated circuit design and inserting parasitics into the hierarchical tree structure resulting from the fill cells on nets of the integrated circuit design, wherein the process parameter for variation comprises a fill cell parameter.

15. A method comprising:

providing a netlist of an integrated circuit design in a hierarchical or nonhierarchical netlist format;

when the nonhierarchical netlist format is provided, generating a hierarchical interconnect model comprising circuit blocks of an integrated circuit design interconnected in a hierarchical tree structure;

when the hierarchical netlist format is provided, generating the hierarchical interconnect model taking into account a hierarchy provided in the hierarchical netlist format, where circuit blocks of an integrated circuit design are interconnected in a hierarchical tree structure;

allowing selecting of a netlist element parameter for variation;

determining a first value for the netlist element parameter for variation;

determining a second value for the netlist element parameter for variation;

using at least one processor, using the interconnect model and the first value for the netlist element parameter, performing a first circuit simulation using the hierarchical interconnect model and saving results for each of the circuit blocks of the hierarchical tree structure;

with the second value, identifying circuit blocks of the hierarchical tree structure that are affected by the change in the netlist element parameter, including circuit blocks in a dependency path of the affected circuit blocks, as affected circuit blocks, wherein other blocks which are not affected are unaffected circuit blocks and the affected circuit blocks are a subset of a total number of circuit blocks; and using at least one processor, using the interconnect model and the second value, performing a second circuit simulation using the hierarchical interconnect model, the second circuit simulation being subsequent to the first circuit simulation, by calculating results for the affected circuit blocks while reusing the results for unaffected blocks from the first circuit simulation, wherein the allowing selecting of a netlist element parameter for variation comprises:

allowing selecting of two or more netlist element parameters for variation, wherein the netlist element parameter is a first netlist element for variation, and the first value and second values are for the first netlist element;

calculating a third value for a second netlist element parameter for variation;

calculating a fourth value for the second netlist element parameter for variation, wherein for the first circuit simulation, the first value is used for the first netlist element parameter and the third value is used for the second netlist element parameter, and for the second circuit simulation, the second value is used for the first netlist element parameter and the third value is used for the second netlist element parameter;

with the first and fourth values, identifying circuit blocks of the hierarchical tree structure that are affected by the change in the netlist element parameter, including circuit blocks in a dependency path of the affected circuit blocks, as affected circuit blocks, wherein other blocks which are not affected are unaffected circuit blocks and the affected circuit blocks are a subset of a total number of circuit blocks;

using the interconnect model and the first and fourth values, performing a third circuit simulation of the integrated circuit design, the second circuit simulation being subsequent to the first circuit simulation, by calculating results for the affected circuit blocks while reusing the results for unaffected blocks from at least one of the first or second circuit simulations;

with the second and fourth values, identifying circuit blocks of the hierarchical tree structure that are affected by the change in the netlist element parameter, including circuit blocks in a dependency path of the affected circuit blocks, as affected circuit blocks, wherein other blocks which are not affected are unaffected circuit blocks and the affected circuit blocks are a subset of a total number of circuit blocks; and using the interconnect model and the second and fourth values, performing a fourth circuit simulation of the integrated circuit design, the second circuit simulation being subsequent to the first circuit simulation, by calculating results for the affected circuit blocks while reusing the results for unaffected blocks from at least one of the first, second, or third circuit simulations.

16. The method of claim 15 wherein the netlist element parameter for variation comprises a transistor sizing.

17. The method of claim 15 wherein the netlist does not include spatial information.

18. The method of claim 15 comprising:

allowing selecting of a first net of the netlist where the netlist element parameter is to be varied, while the netlist element parameter is not varied on a second net of the netlist, wherein the first net is different from the second net.

19. The method of claim 12 wherein the process parameter for variation comprises a resistance.

20. The method of claim 12 wherein the process parameter for variation comprises a capacitance.

* * * * *